US011754972B2

(12) United States Patent
Reichelt et al.

(10) Patent No.: US 11,754,972 B2
(45) Date of Patent: Sep. 12, 2023

(54) METHOD AND DEVICE FOR ENCODING COMPLEX-VALUE SIGNALS FOR THE RECONSTRUCTION OF THREE-DIMENSIONAL OBJECTS

(71) Applicant: SEEREAL TECHNOLOGIES S.A., Munsbach (LU)

(72) Inventors: Stefan Reichelt, Wangen im Allgau (DE); Norbert Leister, Dresden (DE); Anne Frauenhofer, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 1111 days.

(21) Appl. No.: 16/071,096

(22) PCT Filed: Jan. 18, 2017

(86) PCT No.: PCT/EP2017/050929
§ 371 (c)(1),
(2) Date: Jul. 19, 2018

(87) PCT Pub. No.: WO2017/125403
PCT Pub. Date: Jul. 27, 2017

(65) Prior Publication Data
US 2021/0208536 A1    Jul. 8, 2021

(30) Foreign Application Priority Data
Jan. 19, 2016  (DE) .................... 10 2016 100 793.5

(51) Int. Cl.
*G03H 1/08*    (2006.01)
*G03H 1/16*    (2006.01)
(Continued)

(52) U.S. Cl.
CPC ............ *G03H 1/0808* (2013.01); *G03H 1/16* (2013.01); *G03H 1/32* (2013.01); *G06T 9/00* (2013.01); *G03H 2001/0816* (2013.01)

(58) Field of Classification Search
CPC .......... G03H 1/0808; G03H 1/32; G03H 1/16; G03H 2001/0816; G03H 2225/32;
(Continued)

(56) References Cited

U.S. PATENT DOCUMENTS

2005/0075872 A1* 4/2005 Kikuiri ............... H04N 19/124
375/E7.176
2010/0149139 A1* 6/2010 Kroll ...................... G03H 1/02
345/204
(Continued)

FOREIGN PATENT DOCUMENTS

DE    10 2006 003 741 A1    8/2007
WO      2007/082707 A1    7/2007

OTHER PUBLICATIONS

International Search Report, dated Aug. 21, 2017, and Written Opinion issued in International Application No. PCT/EP2017/050929.
(Continued)

*Primary Examiner* — Xilin Guo
(74) *Attorney, Agent, or Firm* — Saul Ewing LLP

(57) ABSTRACT

A method for encoding complex-valued signals of a computer-generated hologram into a phase-modulating optical element for the reconstruction of a three-dimensional object, and to a computer program product for encoding complex-valued signals of a computer-generated hologram, and to a holographic display for the reconstruction of a three-dimensional object. The object is to reduce the effort on encoding a complex-valued spatial distribution by an iteration method on the basis of phase encoding, so that the computer-generated hologram resulting therefrom can be represented more rapidly and with the same or an improved reconstruction quality. In particular, the convergence during the iterative optimization is intended to be accelerated. This is achieved by a method in which degrees of freedom of the hologram plane as well as the reconstruction plane are used for optimizing the iteration method for rapid convergence and maximization of the diffraction efficiency in the signal range.

50 Claims, 17 Drawing Sheets

(51) Int. Cl.
*G03H 1/32* (2006.01)
*G06T 9/00* (2006.01)

(58) Field of Classification Search
CPC ....... G03H 2210/30; G03H 2001/0825; G03H 1/2294; G03H 1/268; G03H 1/08; G03H 1/0005; G06T 9/00; G06T 15/50; G06T 15/005; G06T 7/50; G06T 15/00; G06T 3/4084; H04N 1/4052; H04N 9/3185; H04N 13/271; G02B 27/0103; G02B 5/32; G02B 2027/0174; G02B 5/0252
See application file for complete search history.

(56) References Cited

U.S. PATENT DOCUMENTS

| 2010/0271675 | A1* | 10/2010 | Leister | G03H 1/08 |
| | | | | 359/9 |
| 2011/0096381 | A1* | 4/2011 | Leister | G03H 1/2294 |
| | | | | 359/9 |
| 2011/0149359 | A1* | 6/2011 | Leister | G03H 1/2294 |
| | | | | 359/227 |
| 2011/0153362 | A1* | 6/2011 | Valin | G06Q 20/1085 |
| | | | | 340/5.82 |
| 2012/0105929 | A1* | 5/2012 | Sung | G02B 5/32 |
| | | | | 359/9 |
| 2015/0124302 | A1* | 5/2015 | Leister | G03H 1/26 |
| | | | | 359/9 |
| 2016/0233979 | A1* | 8/2016 | Koike-Akino | H04L 1/0035 |

OTHER PUBLICATIONS

Bernau, "Improved hologram calculation for correlated video frames," 2010 Digest of Technical Papers/International Conference on Consumer Electronics (ICCE 2010): Las Vegas, NV Jan. 9-13, 2010; pp. 507-508 (Jan. 9, 2010) XP031641043.

Nagashima et al., "Reconstruction of holograms generated by using a combination of an iterative method and an error diffusion method," Optics and Laser Technology, pp. 323-327 (Dec. 1, 1993) XP024427812.

Chang et al., "Iterative Interlacing Error Diffusion for Synthesis of Computer-Generated Holograms," pp. 1-30 (Jun. 1, 1992) retrieved from the Internet; URL://https://pdfs.semanticscholar.org/a02f/55bc9afef952bba8d81c83399fa59fea3b46.pdf.

\* cited by examiner without adjustment of the amplitude value
A = 1
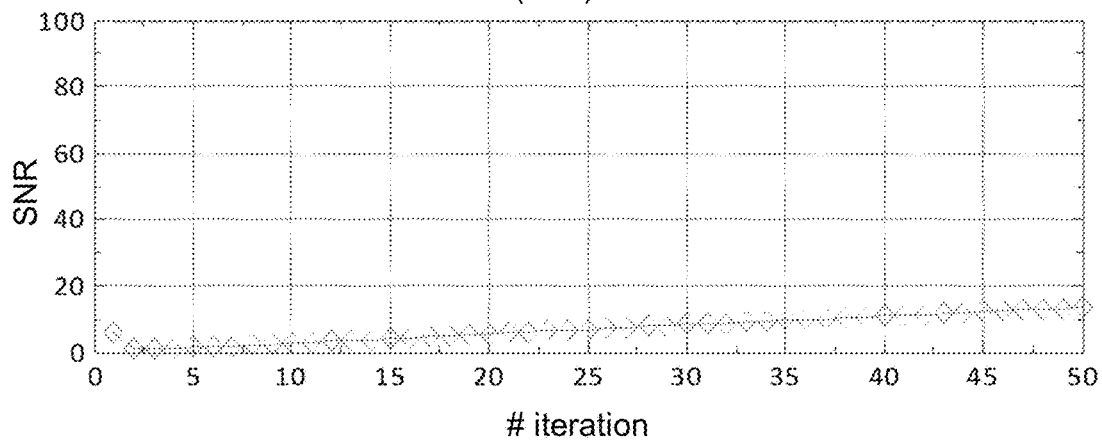
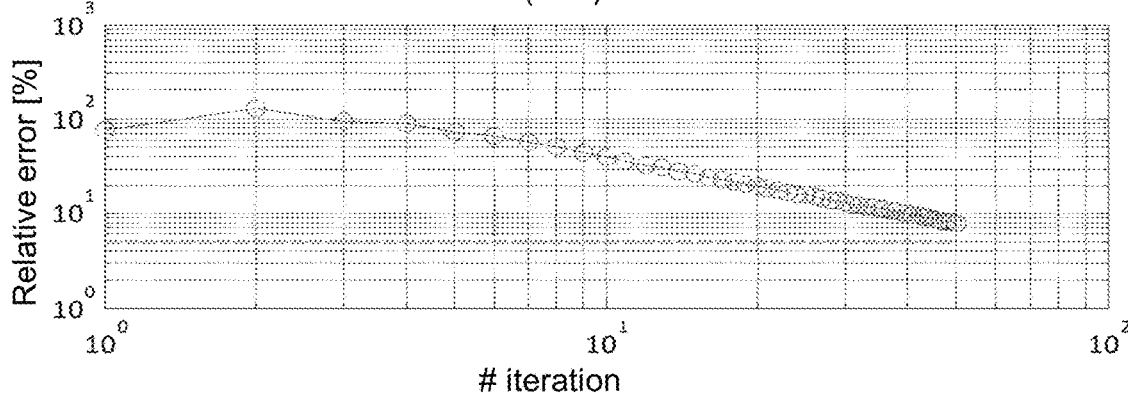
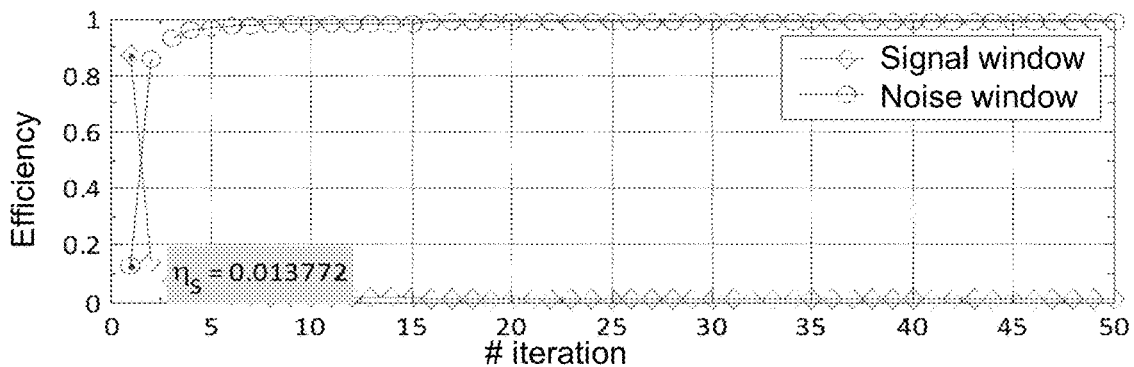
SNR = 100 is not achieved (at k < 50)
Efficiency in the signal range: 1.3%

With adjustment of the amplitude value
A = mean value of the amplitude distribution
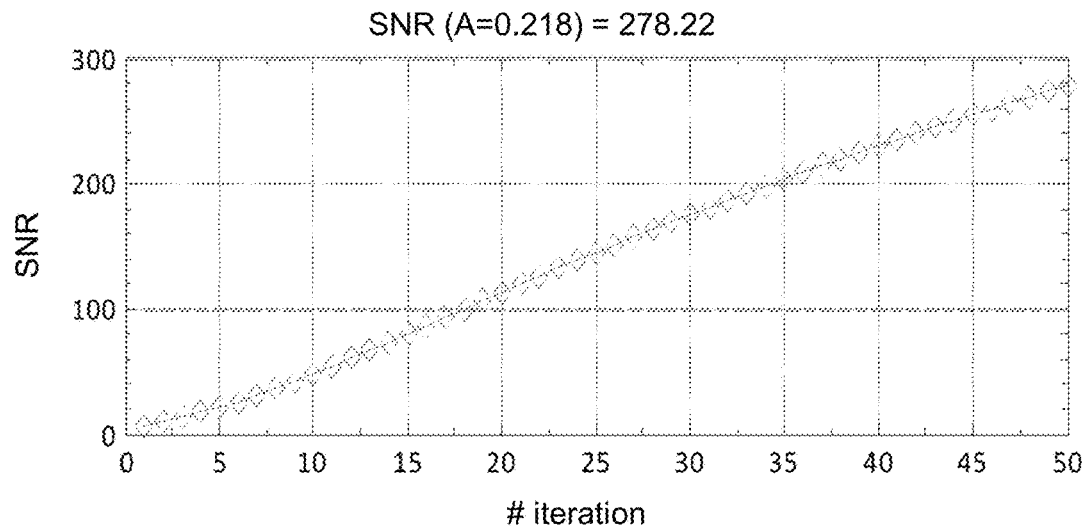
SNR (50 iterations) = 278
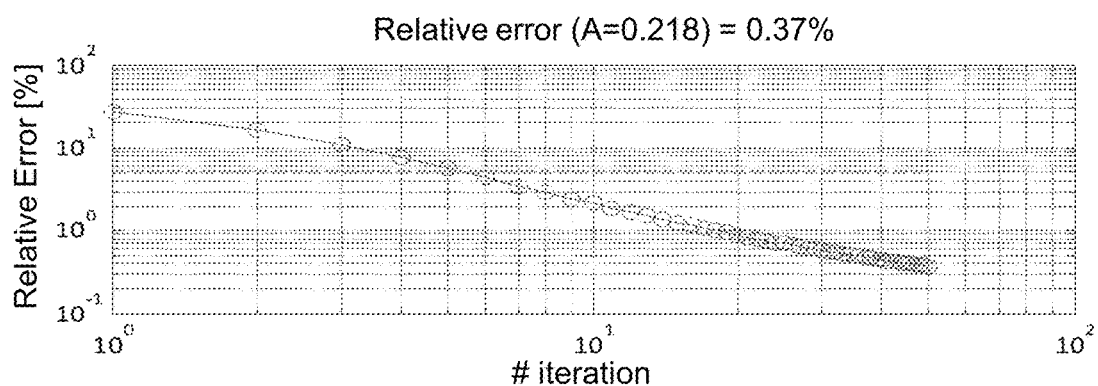
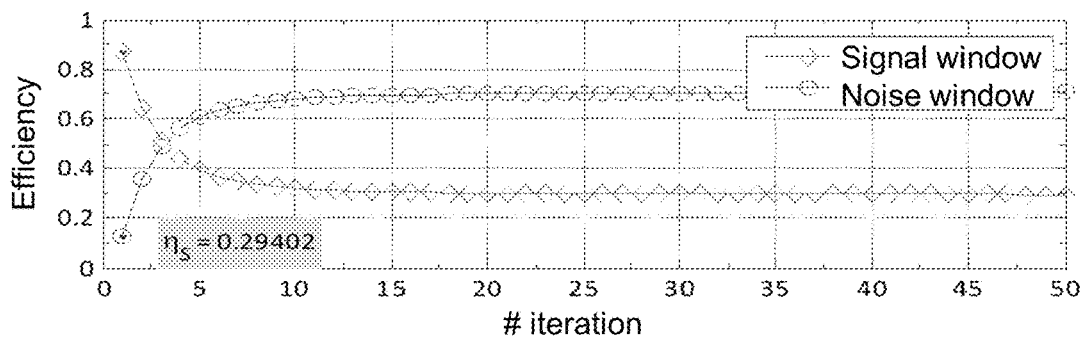
SNR = 100 is achieved after 18 iterations
Efficiency in the signal range: 29.4%

Slight reduction of the signal range (only in the corners)
Area SW:   48.04% (grey)
Area NW:   51.96% (white)
Signal Window.Mask
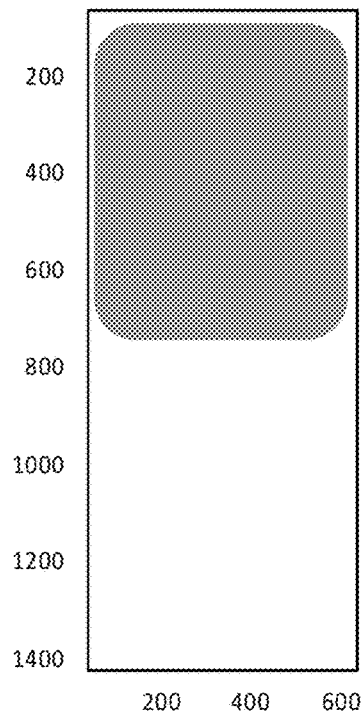
SNR (A=0.218) = 459.27
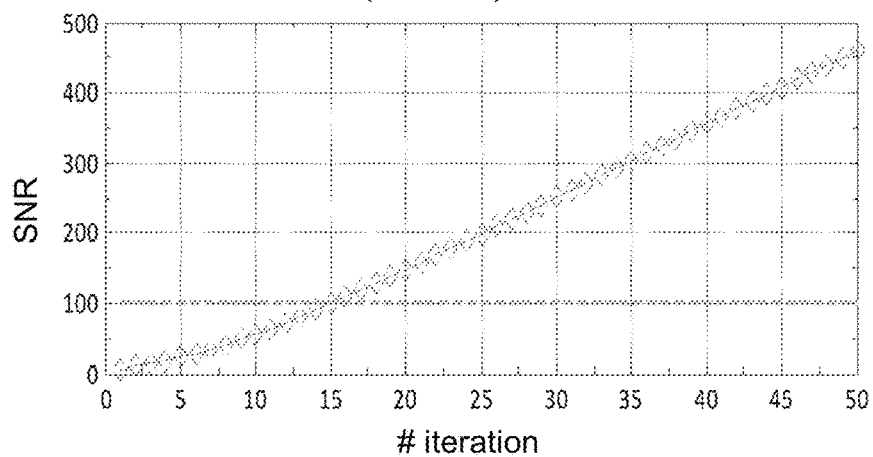
SNR (50 iterations) = 459
Fig. 7a

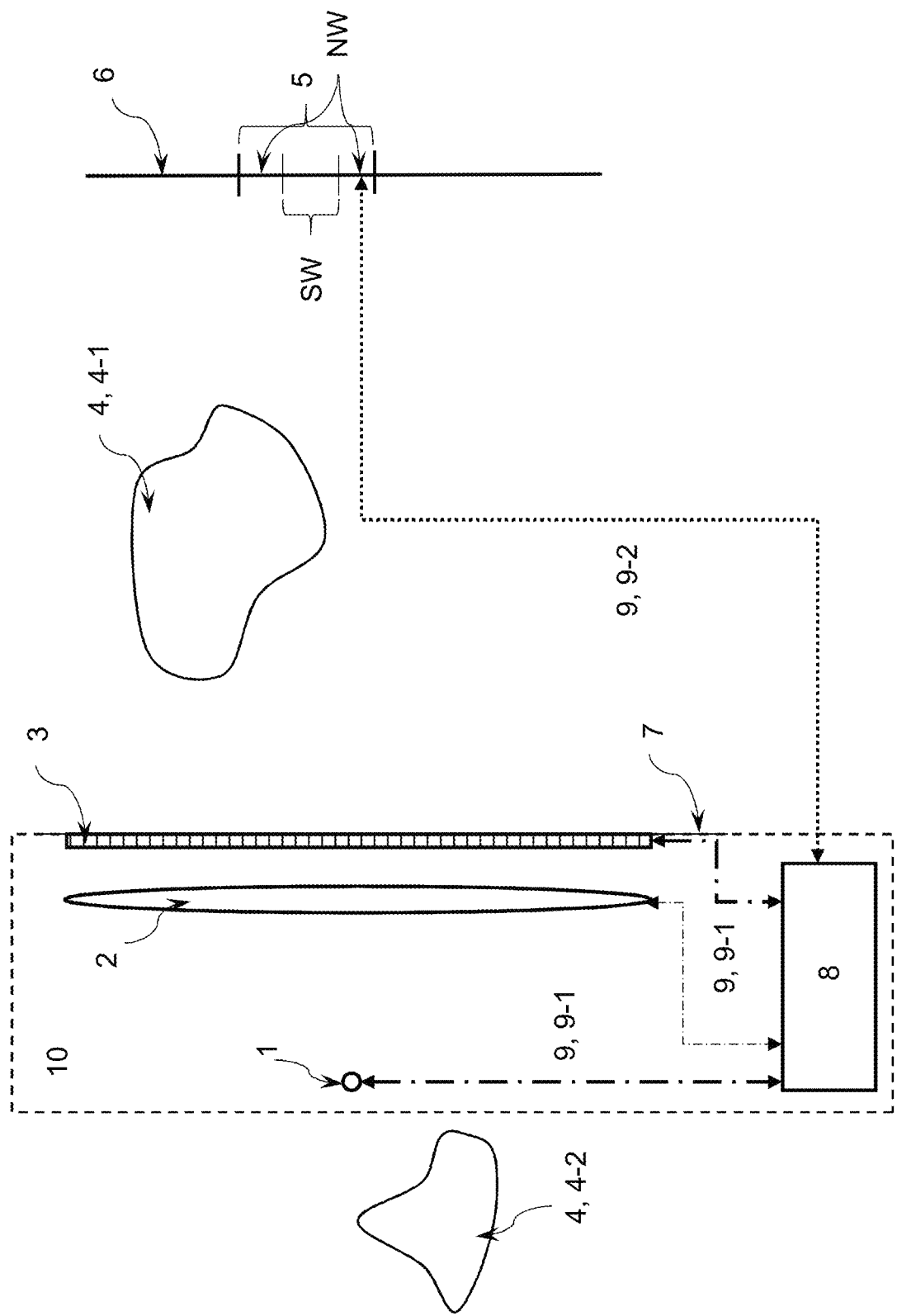

METHOD AND DEVICE FOR ENCODING COMPLEX-VALUE SIGNALS FOR THE RECONSTRUCTION OF THREE-DIMENSIONAL OBJECTS

CROSS REFERENCE TO RELATED APPLICATIONS

This application claims the priority of PCT/EP2017/050929, filed on Jan. 18, 2017, which claims priority to German Application No. DE 10 2016 100 793.5, filed on Jan. 19, 2016, the entire contents of each of which are incorporated fully herein by reference.

BACKGROUND OF THE INVENTION

The invention relates to a method for encoding complex-valued signals of a computer-generated hologram (CGH) into a phase-modulating optical element for the reconstruction of a three-dimensional object, in which a transformation algorithm for iterative calculation of the computer-generated hologram (CGH) is used.

The invention furthermore relates to a computer program product for encoding complex-valued signals of a computer-generated hologram (CGH) into a phase-modulating optical element, and to a holographic display for the reconstruction of a three-dimensional object.

Computer-generated holograms (CGH) are based on the principle of diffraction of a sufficiently coherent electromagnetic wave at the diffracting structures of the CGH, and are used in various fields, for example digital holography, holographic imaging, laser beam shaping, maskless lithography and optical measurement technology. The process of diffraction at the hologram is also referred to as reconstruction. A common aim in said typical applications is to generate a desired wave field with a defined phase distribution and amplitude distribution by diffraction of an incident wave field at the CGH.

The diffraction at the hologram may be understood as modulation of the incident wave into the desired emergent wave. If the incident and resultant waves are known, the ideally required complex amplitude of the hologram function $H_i(x,y)$ can be calculated and produced in a suitable form: in this case, the term computer-generated or synthetic hologram is used.

The step of calculating the ideal hologram function is also referred to as hologram synthesis. In a subsequent encoding step, the complex amplitude $H_i(x,y)$ of the hologram function is converted into a form which can be produced by the characteristics of a given modulator, i.e. its representable value range. In this encoding step, which is also referred to as hologram representation, the ideally required complex amplitude of the hologram function $H_i(x,y)$ is converted into the actually representable form $H_r(x,y)$.

The hologram representation methods known from the prior art may be divided into the following two categories: in the case of direct representation, the incident wave $U_0(x,y)$ is modulated directly by the CGH, so that the reconstruction wave $U_R(x,y)$ emerges directly from the CGH. This corresponds to multiplicative modulation expressed in the form $U_R(x,y)=U_0(x,y) H_r(x,y)$. The best-known example of this direct representation is the kinoform CGH.

In an encoded representation, the signal function $H_r(x,y)$ of the CGH does not correspond directly to $H_i(x,y)$, but is linked to one another by means of an encoding rule $H_r(x,y)=F[H_i(x,y)]$, where F is the encoding rule.

A common feature of the various encoded hologram representation methods is that the hologram is divided into various discrete resolution cells, also referred to as macro-pixels, which are in turn further subdivided into so-called sub-cells, also referred to as sub-pixels. Conventionally, the complex amplitude of the signal function $H_i(x,y)$ is decomposed into pure amplitude values or pure phase values. Examples of this indirect or encoded representation are detour-phase holograms or double-phase holograms.

The present invention relates to the second hologram representation methods mentioned, with encoded reproduction of the signal function, in particular the time-optimized iterative calculation of hologram functions $H_r(x,y)$ which can be represented by pure phase values.

The generation of a complex-valued reconstruction wave having a predetermined amplitude distribution and phase distribution is important inter alia for holographic 3D imaging, since the hologram phase contains the depth information of the scene to be reconstructed, while the grey-value profile or color profile of the reconstruction is determined by means of the hologram amplitude. For realtime holographic 3D imaging with the aid of holographic displays, both realtime-capable hologram synthesis and the specific characteristics of the optical element representing the computer-generated hologram, i.e. generally the spatial light modulator (SLM), are to be taken into account, since this influences not only the reconstruction quality but also the required computational effort of encoding.

Furthermore, for example, commercially available spatial light modulators (SLM) are not suitable for providing mutually independent complex-valued amplitude modulation and phase modulation of the incident wave field. The restricted encoding range resulting from this limited operation curve leads in practical application of the SLM to a reduced diffraction efficiency, increased noise and complementary diffraction orders.

One way of encoding CGHs is to use the conventional two-phase encoding with a phase-modulating spatial light modulator (phase SLM). The principle of the two-phase encoding is based on the fact that a complex value can be represented by two phase values with a complex amplitude. Each complex value with the phase ψ and the amplitude a between 0 and 1 is therefore represented as the sum of two complex numbers with the absolute value of 1 and the phase values ψ±arccos a. Other possibilities, with which a set of complex values can be represented respectively by two or more phase values per complex value, may also be possible. The terms two-phase encoding and phase encoding with k components are to be understood here in the general sense.

Two-phase encoding uses a phase SLM (or more generally a phase-modulating optical element) for representing the phase values. If the two phase values could be encoded at an identical position in the phase SLM, an error-free reconstruction of the three-dimensional object could be achieved with a CGH encoded in this way. In practice, however, the phase values can only be written into the two controllable pixels of the phase SLM (or ranges of the phase-modulating optical element) lying next to one another or optionally above one another, and therefore have a position offset. In the case of encoding with more than two phase values, the situation would be proportional to the number of phase values. The offset leads to errors in the reconstruction of the CGH. However, phase encoding has advantages over the encoding of an amplitude hologram on an amplitude SLM, and is consequently still the preferred method. In order to exploit the advantages of two-phase encoding, however, measures that lead to an improvement in the reconstruction quality are necessary. This may be achieved by using an iteration method in the CGH encoding.

Conventional methods and devices for the encoding of complex-valued signals for the reconstruction of three-dimensional objects by pure phase values are described in the documents DE 10 2006 003 741 B4 and US 2010/0271675 A1 in the name of the applicant.

Various numerical algorithms for solving inverse problems in optics are known from the prior art. Best known is the iterative Fourier transform algorithm (IFTA), which is used for example to deduce, from known intensity distributions in a plane perpendicular to the light propagation direction, the phase distribution on another plane, which leads to this intensity distribution. The IFTA it is therefore a numerical method with which a target distribution (or object distribution) specified as a dataset and the desired object distribution (or target distribution) is determined by means of a propagation operator. The method is described in Gerchberg, R. and Saxton, W.: "A practical algorithm for the determination of phase from image and diffraction plane pictures" Optik, 1972, 35, 237-246. A review of the techniques developed therefrom are presented in Fienup, J. R.: "Phase retrieval algorithms: a comparison" Appl. Opt., OSA, 1982, 21, 2758-2769.

The iterative encoding methods known from the prior art for the representation of a complex-valued distribution into a pure phase distribution have the disadvantage that they converge very slowly and therefore require very great computational effort. Typically, from 500 to 1000 iteration steps are required until a reconstruction quality with a residual error of less than 1% is achieved. For this reason, realtime representation of iteratively optimized phase-encoded CGHs in holographic 3D displays is currently possible only with difficulty.

SUMMARY OF THE INVENTION

The object of the present invention is therefore to provide and refine a method and a device of the type mentioned in the introduction, by which the aforementioned problems are overcome. In particular, the effort of encoding of a complex-valued spatial distribution by an iteration method on the basis of phase encoding is intended to be reduced, so that the CGH resulting therefrom can be represented more rapidly on a phase-modulating optical element, in particular on a phase-modulating spatial light modulator, with the same or an improved reconstruction quality, and furthermore so as to develop realtime encoding of holograms, in particular for their use in holographic 3D displays.

The specific object of the invention is therefore to accelerate the convergence during the iterative optimization, and in this case to maximize the diffraction efficiency in a signal range and minimize the number of iteration steps required before reaching a required quality feature.

The object is achieved according to the invention by a method corresponding to the teaching of patent claim 1. Further advantageous configurations of the invention may be found in the dependent claims.

In a method for encoding complex-valued signals of a computer-generated hologram (CGH) into a phase-modulating optical element for the reconstruction of a three-dimensional object, a transformation algorithm for iterative calculation of the computer-generated hologram (CGH) is used, and by transformation of object data sets of the three-dimensional object into a signal range of a two-dimensional periodicity interval in an observer plane, a two-dimensional distribution of complex values of a wave field is initially calculated, this distribution forming a complex-valued setpoint value distribution and being used as a comparison basis for the iterative calculation of the control values of the encoding, where the two-dimensional periodicity interval comprising the signal range and a noise range. The two-dimensional periodicity interval is in this case the lateral extent of an order in the far field of a incremental computer-generated hologram.

In the context of this invention and description, the expression that by transformation of object data sets of the three-dimensional object into a signal range of a two-dimensional periodicity interval in an observer plane, a two-dimensional distribution of complex values of a wave field is calculated also includes inter alia the following procedure:

A three-dimensional object is decomposed into object points. For each object point, a sub-hologram is calculated in a hologram plane. The sub-holograms of the individual object points are added to form a complex-valued sum hologram. A transformation of the complex-valued sum hologram from a hologram plane into the signal range of an observer plane is carried out. The result of this transformation then forms the complex setpoint value distribution in the signal range.

As an alternative, the expression above also involves inter alia the following procedure:

A three-dimensional object is decomposed into section planes, and object points are respectively assigned to a section plane. A transformation from the respective section planes into the signal range in an observer plane is carried out. In the signal range, the transforms of the individual section planes are summed. The sum of the transforms of all the section planes then gives a complex-valued setpoint value distribution in the signal range.

In general, however, the transformation of object datasets of the three-dimensional object into a signal range is not restricted to these two specific embodiments, but may also be carried out in another way.

A phase-modulating optical element which may be used for this is, for example, a phase-modulating spatial light modulator or a diffractive phase element. It can be encoded with position resolution. Preferably, it has a pixel structure. A fixed or bounded pixel structure is not, however, absolutely necessary: it is also possible to use a phase-modulating optical element in which size-variable ranges of the phase-modulating optical element—and therefore variable discrete resolution cells—can be encoded.

Such a phase-modulating optical element may, for example, be part of an optical system of a holographic display.

The Fourier transform algorithm may preferably be used as a transformation algorithm. Nevertheless, other transformation algorithms for iterative calculation of a computer-generated hologram are also possible, for example the Fresnel transform or the Laplace transform.

The complex-valued signals to be encoded represent complex-valued spatial distributions, i.e. in particular a complex-valued electromagnetic wave distribution $U(x,y,z)=A(x,y) \exp[i\phi(x,y,z)]$, which can be described by its amplitude distribution $A(x,y,z)$ and phase distribution $\phi(x,y,z)$.

The observer plane, into which the object data sets of the three-dimensional object are transformed, is also referred to as a reconstruction plane, and when using the Fourier transform algorithm it is the Fourier plane.

After this first transformation of object datasets of the three-dimensional object, in a numerical iteration in repeating integration steps by inverse transformation of the complex-valued setpoint value distribution of the signal range of a complex-valued actual value distribution of the noise range of the two-dimensional periodicity interval of the observer plane into a hologram plane of the phase-modulating optical element, a transformed complex-valued distribution consisting of amplitude values and phase values is then determined. When using the Fourier transform, operation is thus carried out in this case with the inverse Fourier transform of the distributions.

From the transformed complex-valued distribution consisting of amplitude values and phase values, a distribution of phase values as control values of the encoding of the phase-modulating optical element is determined. By transformation of this distribution of phase values into the two-dimensional periodicity interval of the observer plane, a complex-valued actual value distribution is again determined, until a termination criterion is fulfilled.

The complex-valued actual value distribution is in this case determined by transformation—i.e. for example by Fourier transform—of the distribution of phase values into the entire two-dimensional periodicity interval of the observer plane, i.e. both into the signal range and into the noise range.

In the distribution of phase values which are determined as control values of the encoding of the phase-modulating optical element, at least two phase values are provided for each complex value.

Finally, the phase-modulating optical element, i.e. for example a phase-modulating spatial light modulator, is encoded with the last determined distribution of phase values as control values.

In the method according to the invention, degrees of freedom are then used for optimization of the iteration method, i.e. of the transformation algorithm for the iterative calculation of the computer-generated hologram, in the sense of rapid convergence and maximization of the diffraction efficiency in the signal range.

The method according to the invention is, in particular, characterized in that, from the statistical distribution of amplitude values of the computer-generated hologram to be encoded, a suitable amplitude value A(k) is determined which specifies the amplitude boundary condition in the sense of better convergence during the numerical iteration.

The amplitude value of the amplitude boundary condition may be constant over all the iteration steps or alternatively dynamically variable between two successive iteration steps, i.e. $A(k) \neq A(k+1)$.

If the amplitude value is constant, it thus need not necessarily be 1. The amplitude boundary condition is fulfilled when the amplitude assumes a positive amplitude value $0 \leq A(k) \leq 1$. The amplitude boundary condition is in this case a boundary condition in the hologram plane, which is also referred to as the object plane.

The method according to the invention is furthermore, or as an alternative, characterized in that at least one of the parameters: size, shape, position and weighting filter, i.e. apodization, of the signal range (signal window, SW), which is also referred to as the observer window and in which the complex-valued signal is reproduced with minimized errors, is adapted in such a way that the noise range (noise window, NW) of the periodicity interval is enlarged in comparison with the signal range. The boundary conditions mentioned here are thus boundary conditions in the reconstruction plane, or observer plane.

The signal range is the subrange of the periodicity interval in the observer plane, from which the holographic reconstruction can be observed, since it is reproduced here with minimized error. The remaining part of the periodicity interval is, as already described, the noise range in which observation of the holographic reconstruction would not be appropriate, but which can advantageously contribute to rapid convergence of the iterative method.

In the case of combining two phase pixels of the phase-modulating spatial light modulator, for example to form a macro-pixel, the signal range is precisely half as large as the periodicity interval in the observer plane. If four phase pixels are combined to form a macro-pixel, the signal range is only one fourth as large as the periodicity interval in the observer plane.

The size, shape and position of the signal range are, however, freely selectable if a number of the phase pixels to be combined in the object plane is not presupposed. The convergence of the iteration method is in principle improved for a noise range selected to be larger. For example, the corners of the signal range may be rounded, if it is taken into account that there is a circular pupil which may move inside the signal range until it reaches the edge of the signal range with its edge. The area proportion obtained in this way may be used to increase the noise range, in order to accelerate the convergence.

The relative area proportion between the signal range and the two-dimensional periodicity interval $R = A_S/A_P$ may thus, in the context of the invention, assume a real positive numerical value $\{R \in R | R > 0\}$, and need not necessarily be a positive rational, as is the case when combining an integer number of sub-pixels to form a macro-pixel.

The number of sub-pixels of the computer-generated hologram in the hologram plane which are combined to form a macro-pixel is thus not established, as is otherwise conventional, but instead the size, shape, position, weighting filter, etc. of the signal range in the periodicity interval of the observer plane is specified.

Combination of the two parameter families, i.e. the adaptation of the amplitude boundary condition in the hologram plane and the adaptation of the boundary conditions in the observer plane, is advantageous. However, the two types of adaptation of iteration parameters may also be used separately for optimization of the transformation algorithm for the iterative calculation.

Advantageously, a complex-valued starting distribution in the noise range is selected in a first iteration step.

It is, however, also advantageously possible that a starting distribution of phase values of the phase-modulating optical element is selected, and a complex-valued actual value distribution is determined in a first iteration step by transformation of this distribution of phase values into the two-dimensional periodicity interval of the observer plane.

To this end, for a sequence of computer-generated holograms (CGH), the actual values from the last iteration step in the preceding computer-generated hologram from the sequence can be used as a complex-valued starting distribution in the noise range or as a starting distribution of phase values of the phase-modulating optical element for a computer-generated hologram from the sequence.

An advantageous convergence of the iterative optimization of the computer-generated hologram to be encoded is achieved in a method according to the invention when an expectation value for use as an amplitude boundary condition during the numerical iteration is determined from the probability density function of the amplitude values of the computer-generated hologram to be encoded in order to optimize the computer-generated hologram to be encoded.

Thus, for example in the case of holograms having a circularly symmetrical complex-valued distribution, the mean value of the nominal amplitude values may readily be established as an amplitude boundary condition. In this case, the mean value of all the amplitude values corresponds to the expectation value of a Rayleigh distribution.

If, in a method according to the invention, a Fourier transform is used as the transformation algorithm, then the transformation algorithm for the iterative calculation may advantageously carry out k iteration steps as follows:

(1) application of the inverse Fourier transform to a matrix U(u,v,k) for calculation of the complex amplitude in the hologram plane, i.e. IFT{U(u,v,k)}=H(x,y,k)=A(x,y,k)exp[iφ(x,y,k)], (2) definition of the amplitude boundary condition in the hologram plane, i.e. determining the output boundary conditions in the hologram plane, $A_c(x,y,k) \leq 1$, where the amplitude value of the amplitude boundary condition may optionally be constant over all k iteration steps.

(3) application of the Fourier transform to the corrected hologram function FT{$A_c$(x,y,k)exp[iφ(x,y,k)]}=U(u,v,k) for calculation of an actual value distribution, i.e. calculation of the wave field, in the observer plane, here also referred to as the Fourier plane, and assessment of the signal quality by means of a quality criterion, for example the signal-to-noise ratio (SNR), between the actual value distribution and the setpoint value distribution in the signal range for comparison with the termination criterion. In the assessment of the signal quality, comparison is thus carried out between a current and a nominal complex-valued field, the latter also being referred to as the signal target function.

(4) determination of input boundary conditions in the observer plane by rewriting the complex-valued setpoint value distribution, i.e. the signal target function, into the signal range of the periodicity interval, i.e. of the matrix U: S(u,v)→U(u,v,k), so long as the termination criterion is not fulfilled. For the noise range, on the other hand, the actual value distribution determined in the preceding iteration step is used.

Preferably, in a method according to the invention, the following definition of the signal-to-noise ratio is used as a quality criterion for the complex-valued distributions:

$$SNR = \frac{\int\int_D |S_n(u,v)|^2 dudv}{\int\int_D |S_n(u,v) - \beta S_r(u,v)|^2 dudv}$$

with $$\beta = \frac{\int\int_D \mathrm{Re}[S_n(u,v) \cdot S_r(u,v)]dudv}{\int\int_D |S_r(u,v)|^2 dudv}$$

where $S_n$ is the setpoint value distribution, i.e. the nominal signal, in the signal range, $S_r$ is the actual value distribution, i.e. the current signal to be evaluated, in the signal range, and the integration is carried out over the area D. Preferably, the area D in this case corresponds to the signal range SW.

In the case of a matrix of values $u_i$, $v_k$, the integral may in this case also be replaced in the usual way by a double sum.

$$SNR = \frac{\sum_{i,k} |S_n(u_i, v_k)|^2}{\sum_{i,k} |S_n(u_i, v_k) - \beta S_r(u_i, v_k)|^2}$$

with $$\beta = \frac{\sum_{i,k} \mathrm{Re}\{S_n(u_i, v_k) \cdot S_r(u_i, v_k)\}}{\sum_{i,k} |S_r(u_i, v_k)|^2}$$

and the sums i,k are formed over all values in the signal range SW.

Advantageously, in the method according to the invention, in at least one iteration step the determination of a distribution of phase values as control values of the encoding of the phase-modulating optical element from the transformed complex-valued distribution of amplitude values and phase values may be carried out as follows:

(1) determination of an error for each value of the complex-valued distribution of amplitude values and phase values (2) addition of this error by an error diffusion method with weighting to the neighboring complex values, so that a modified complex-valued distribution results (3) setting of the amplitudes of the complex-valued distribution modified in this way to a constant value.

Furthermore preferred is a method in which the zero order spot in the two-dimensional periodicity interval is arranged outside the signal range. A zero order spot may, for example, occur when a fraction of the incident light is not modulated because of insufficient coherence, or when the light modulator has systematic deviations from the desired modulation, for example an offset of the amplitude values. If the optical system has a focusing means, then the unmodulated light or systematically incorrectly modulated light is focused into a spot in the observer plane.

Advantageously, the computer-generated hologram to be encoded of the method according to the invention comprises a single-parallax hologram or a full-parallax hologram, i.e. a 1D or 2D hologram. While a single-parallax hologram is easier and faster to calculate, a full-parallax hologram allows movement of an observer in different directions.

Furthermore advantageous is a method according to the invention in which the signal range is additionally weighted in such a way that the complex-valued signal is optimally present in its middle and decreases in its quality toward its edge. Thus, a weighting filter defined over the signal range, which defines the quality of the signal inside the signal range, is used as a further degree of freedom of the iterative optimization.

The quality assessment of the signal reconstructed in the iteration steps may be carried out by weighting with two-dimensional apodization functions. As an alternative, a quality decrease toward the edge of the signal range may also be achieved by increasingly inserting individual noise pixels into the actual signal range toward the edge, i.e. a gradual transition into the noise range is produced.

In a particular embodiment of the method according to the invention, in which a colored computer-generated hologram (CGH) is encoded into a phase-modulating optical element for the reconstruction of a three-dimensional object, the calculation of the phase values by means of numerical iteration for the encoding of the colored computer-generated hologram for each primary color, i.e. red, green and blue, is carried out separately in sub-holograms, which are combined to form the colored computer-generated hologram.

The phase-modulating optical element may in this case, for example, be a phase-modulating spatial light modulator or a diffractive phase element, where the phase-modulating optical element may be contained in a holographic display.

In a phase-modulating spatial light modulator, a colored computer-generated hologram may for example be represented by sub-pixels for each primary color, or alternatively in chronologically successive display of sub-holograms of each primary color.

In order to be able to corresponding provide to both of an observer's eyes, in a particularly preferred method according to the invention a two-dimensional distribution of complex values of a wave field is calculated by transformation of object data sets of the three-dimensional object into a first signal range of a first two-dimensional periodicity interval of an observer plane, which interval contains a first signal range and a first noise range, and into a second signal range of a second two-dimensional periodicity interval of the observer plane, which interval contains a second signal range and a second noise range. The iterative calculation of the control values of the encoding of the spatial light modulator is carried out for both two-dimensional periodicity intervals.

The first signal range of the first two-dimensional periodicity interval is in this case provided for the observer's first eye and the second signal range of the second two-dimensional periodicity interval is provided for the observer's second eye. Naturally, it is also possible to provide further periodicity intervals for further observers.

At least one of the parameters: size, shape, position and weighting filter of the signal range (SW) of the periodicity interval may advantageously be modified in the course of the repeating iteration steps.

Preferably, for the encoding of complex-valued signals of a computer-generated hologram (CGH) in a phase-modulating optical element, the computer-generated hologram (CGH) is divided into clusters. The determination of a distribution of phase values as control values of the encoding of the phase-modulating optical element may be carried out individually for each cluster.

The size of the clusters may be determined in such a way that it essentially corresponds to the typical size or maximum size of a sub-hologram in the computer-generated hologram (CGH).

At least one of the parameters: size, shape, position and weighting filter of the signal range of the periodicity interval may to this end be selected differently for the individual clusters.

In summary, the object is thus achieved by a method in which the available degrees of freedom of the iteration method are adapted optimally to the encoding problem, and to specific conditions of the reconstruction geometry.

The starting point of this iterative encoding method according to the invention is a two-dimensional complex-valued distribution of a wave field, which is converted by a rapidly converging iterative optimization into a two-dimensional phase distribution, in such a way that error-minimized reconstruction of the original wave field is made possible.

In terms of the device, the object mentioned in the introduction is achieved on the one hand by a computer program product which is configured to carry out a method according to the invention for encoding complex-valued signals of a computer-generated hologram (CGH) into a phase-modulating optical element for the reconstruction of a three-dimensional object.

The computer program product may be part of a control unit with which a phase-modulating optical element, for example a holographic display, can be encoded according to the method according to the invention. The computer program product may, however, also be stored on a data medium or accessed from an external storage medium via a communication link by a control unit with which a phase-modulating optical element can be encoded according to the method according to the invention.

In terms of the device, the object mentioned in the introduction is furthermore achieved by a holographic display for the reconstruction of a three-dimensional object, which comprises an optical system, which comprises a light source for providing sufficiently coherent light, transformation optics and a phase-modulating optical element having a hologram plane, and furthermore a control unit which is configured for calculating the encoding of a computer-generated hologram of the three-dimensional object and for providing the corresponding control signals for the optical system, in particular for the phase-modulating optical element.

The transformation optics may, in particular, comprise a transformation lens or a transformation lens system. A phase-modulating optical element may, for example, be represented by a phase-modulating spatial light modulator or a diffractive phase element. It is used to display a computer-generated hologram (CGH).

The reconstruction of the three-dimensional object can in this case be seen in a signal range of a two-dimensional periodicity interval of an observer plane. The reconstructed three-dimensional object can in this case preferably be represented between the observer plane and the hologram plane and/or behind the hologram plane. Explicitly, parts of the three-dimensional object may thus lie between the observer plane and the hologram plane, and other parts of the three-dimensional object may lie behind the hologram plane as seen from the observer plane.

The control unit preferably comprises a processor for providing control signals for the encoding and means for reconstructing a three-dimensional object. In particular, it is configured to carry out the method described above.

According to the invention, the control unit is furthermore configured to carry out a method according to the invention for encoding complex-valued signals of a computer-generated hologram (CGH) into a phase-modulating element for the reconstruction of a three-dimensional object.

To this end, the control unit may comprise further means. In particular, these means are:

selection means for providing object datasets of a three-dimensional object, for establishing a transformation range for the iterative calculation and for summing the complex values of the transformations of the object data sets in the transformation range transformation means for carrying out the transformations between the object planes and the observer plane or the plane of the phase-modulating optical element and the observer plane and for calculating the encoding of the computer-generated hologram comparison means for determining deviations between the complex-valued setpoint value and actual value distributions in the signal range and for signaling termination of the iteration steps when the defined termination criterion is reached and reconstruction means for carrying out the reconstruction of the encoded computer-generated hologram.

Preferably, the holographic display according to the invention comprises a spatial light modulator, in particular a phase-modulating spatial light modulator (phase SLM), as the phase-modulating optical element. The phase-modulating spatial light modulator contains the hologram plane of the computer-generated hologram to be encoded, and can modulate the phase of the incident wave over a value range of $2\pi$. By diffraction of sufficiently coherent light at the controllable pixels of the light modulator, the encoded information of the three-dimensional object is reconstructed holographically.

In particular, the holographic display according to the invention may comprise a filter, for example a spatial filter, for carrying out filtering between the signal range and the noise range. It is therefore possible to achieve spatial separation of interfering light or noise and the desired signal in a straightforward way.

For the encoding of a colored computer-generated hologram, a preferred embodiment of the holographic display according to the invention contains in the phase-modulating optical element sub-pixels for encoding sub-holograms for each primary color, i.e. red, green and blue. In a phase-modulating spatial light modulator, to this end pixels can optionally be split with variable size into sub-pixels, or in general ranges of the phase-modulating optical element can be defined as pixels or sub-pixels.

As an alternative, a preferred embodiment of the holographic display according to the invention is configured to display sub-holograms of each primary color in chronological succession.

The color hologram is then composed of the sub-holograms for the different primary colors. A sub-hologram is in this case thus intended to mean a respective monochromatic computer-generated hologram of the three-dimensional object. The iterative optimization of the phase values as control values for the phase-modulating optical element is in this case carried out separately for each primary color.

There are then various possibilities for advantageously configuring the teaching of the present invention and/or for combining the embodiments described above with one another. In this regard, references to be made on the one hand to the patent claims dependent on the independent patent claims, and on the other hand to the following explanation of the preferred exemplary embodiments of the invention with the aid of the drawings, in which generally preferred configurations of the teaching will also be explained.

BRIEF DESCRIPTION OF THE DRAWINGS

In the drawings:

FIG. 4 shows a comparison of the simulation result of the method according to the invention (FIG. 4b) with the method according to the prior art (FIG. 4a) for adaptation of the amplitude value in the hologram plane;

FIG. 13 shows a holographic display according to the invention for the reconstruction of a three-dimensional object.

DETAILED DESCRIPTION OF THE INVENTION

Figure 1:
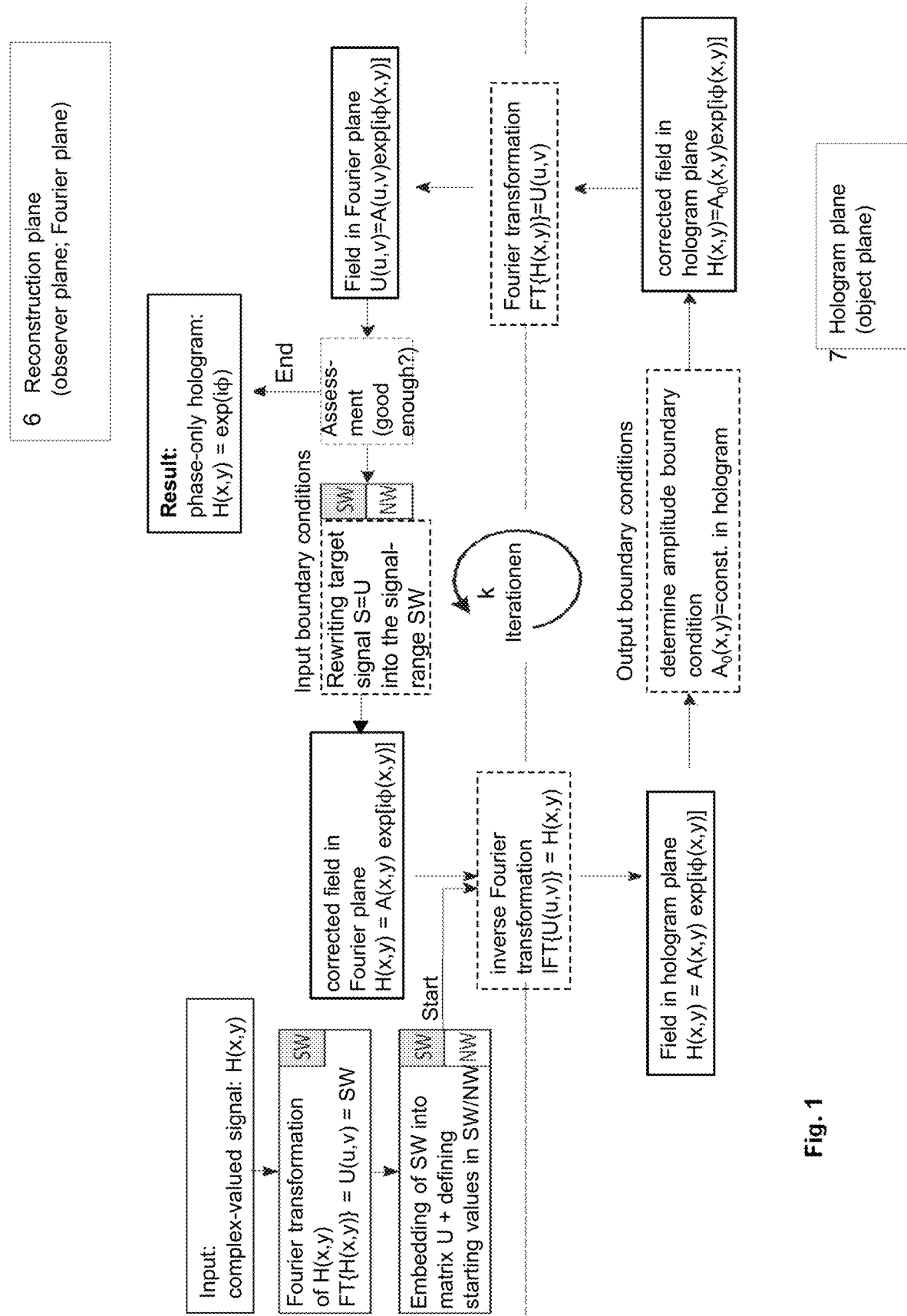
FIG. 1 shows a schematic representation of a method according to the invention for encoding complex-valued signals in a light modulator of a holographic display for the reconstruction of three-dimensional objects.

FIG. 1 shows a schematic representation of a method according to the invention for encoding complex-valued signals into a phase-modulating optical element 3, which is formed here by a phase-modulating spatial light modulator and is used in a holographic display for the reconstruction of three-dimensional objects 4. In this case, an adapted iterative Fourier transform algorithm (IFTA) is used between the reconstruction plane 6 (also referred to here as the Fourier plane) and the hologram plane 7 with repeating iteration steps.

The starting point of this iterative encoding method is a two-dimensional complex-valued distribution of a wave field, which is intended to be converted by the iteration method into a two-dimensional phase distribution, in such a way that error-minimized reconstruction of the original wave field in a signal range SW, which is also referred to as the observer window, is made possible.

Let the two-dimensional complex-valued distribution of a wave field be referred to as a nominal complex-valued hologram signal function $H_i(x,y)$. Before the iteration method carries out a certain number of iterations, the starting values in the Fourier plane 6 are initially defined in three steps. In a first step, the Fourier transform of the nominal complex-valued hologram signal function $H_i(x,y)$ is calculated, here for example by means of a discrete fast Fourier transform (DFFT). The Fourier transform of the complex amplitude of the hologram signal function $FT\{H_i(x,y)\}=S(u,v)$ is the nominal complex-valued signal function $S(u,v)$ in the Fourier plane 6, which is used as a target function during the iterative optimization.

In a second step, the complex-valued signal function $S(u,v)$ is embedded into a matrix $U(u,v)$, which has the size N×M that corresponds to the spatial resolution of the computer-generated hologram, or of the phase-modulating spatial light modulator 3 on which the hologram is intended to be represented. The signal range SW occupies an area proportion which is conventionally less than the periodicity interval 5 of the computer-generated spatial light modulator 3. Then, according to the invention, the signal range SW is furthermore modified in size, shape, position or weighting filter. The range of the matrix U(u,v) not occupied by the signal function is referred to as the noise range NW.

In a third step, the starting value distribution in the noise range NW is defined. The complex-valued starting distribution in the noise range NW is freely selectable, and is therefore used as a further parameter in the context of the method according to the invention.

The actual iteration method then begins, which alternately transforms forward and backward in k iteration steps between the spatial frequency space in the Fourier plane 6 and the object space in the hologram plane, in order to minimize deviations from setpoint values stepwise. The methods of inverse Fourier transform (IFT) and Fourier transform (FT) are used. The iterative algorithm carries out the k iteration steps as follows:

(1) application of the inverse Fourier transform to the matrix U(u,v,k) for calculation of the complex amplitude in the hologram plane, i.e. IFT{U(u,v,k)}=H(x,y, k)=A(x,y,k)exp[iφ(x,y,k)], (2) establishment of the output boundary condition in the object plane or hologram plane, by definition of the amplitude boundary condition $A_c(x,y,k) \leq 1$, (3) application of the Fourier transform to the corrected hologram function FT{$A_c(x,y,k)$exp[iφ(x,y,k)]}=U(u,v, k) in order to calculate the field in the Fourier plane 6 and in order to assess the signal quality by means of a quality criterion, for example the signal-to-noise ratio (SNR) between the current and nominal complex-valued field, (4) establishment of input boundary conditions in the reconstruction or Fourier plane 6, i.e. in this case rewriting the signal target function into the signal range SW of the matrix: U: S(u,v)→U(u,v,k).

The iteration loop is repeated until a predetermined quality criterion is fulfilled or a predetermined iteration number is reached. Here, the following definition for the signal-to-noise ratio is used as a quality criterion for complex-valued signals, or distributions $$SNR = \frac{\iint_D |S_n(u, v)|^2 du dv}{\iint_D |S_n(u, v) - \beta S_r(u, v)|^2 du dv}$$

with $$\beta = \frac{\iint_D Re\{S_n(u, v) \cdot S_r(u, v)\} du dv}{\iint_D |S_r(u, v)|^2 du dv}$$

where $S_n$ is the nominal signal and $S_r$ is the current signal to be evaluated, and the integration is carried out over the area D. Preferably, the area D corresponds in this case to the signal range SW.

The result of the iterative optimization method is a distribution consisting of phase values, i.e. a phase hologram, which reconstructs with minimized error a complex-valued signal, i.e. a three-dimensional object or its wave distribution, when filtering is carried out between the signal range SW and the noise range NW. The spatial filtering between the signal and noise ranges may, for example, be carried out by a spatial filter which is positioned in a Fourier plane 6 of the optical system, which contains the CGH. For example, in the method of "viewing-window holography", i.e. observer-window holography, for 3D visualization with holographic displays, the spatial filtering is carried out directly by the eye pupil of the observer, which is located in the Fourier plane 6 of the holographic display.

Figure 2A:
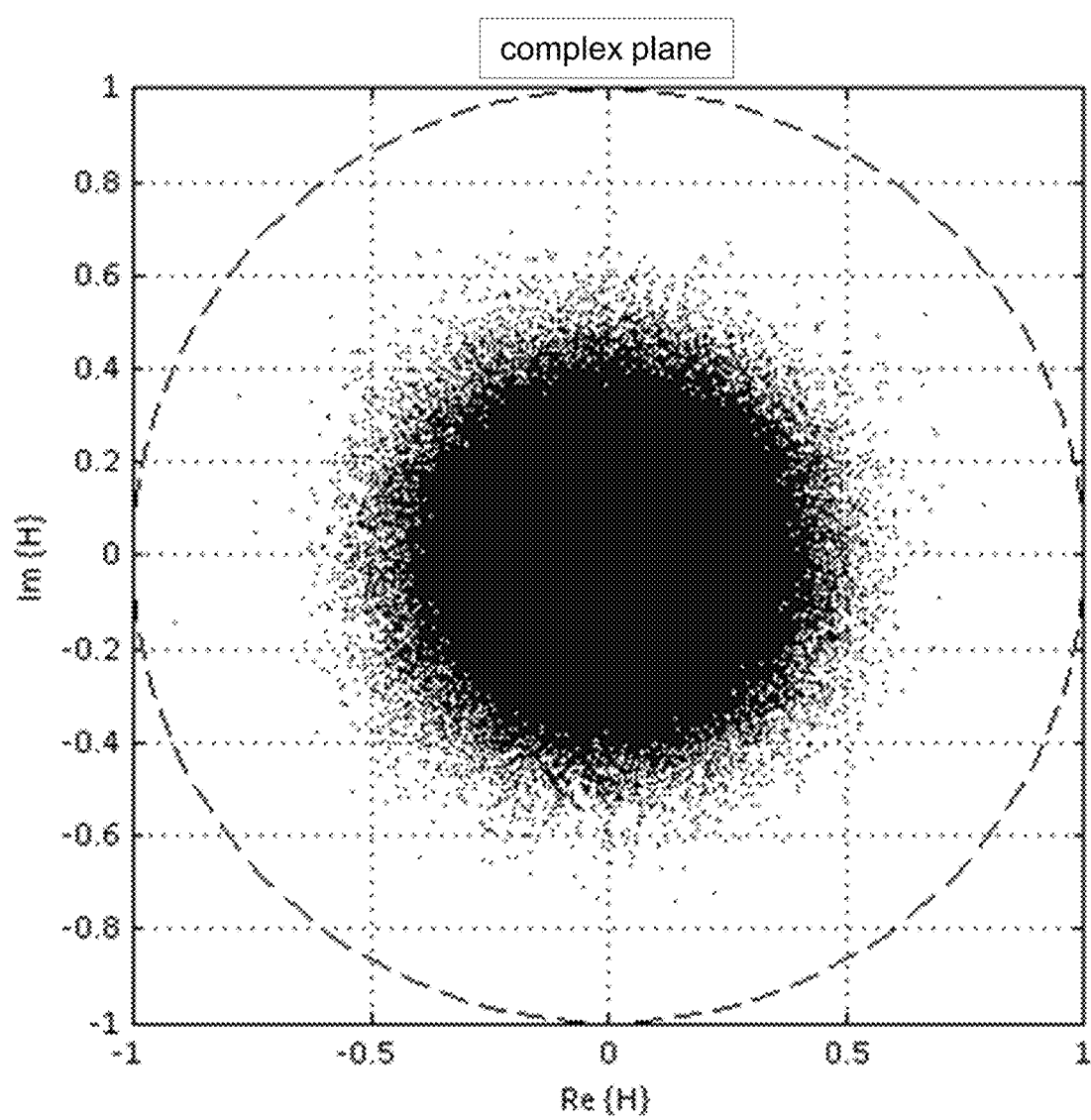
FIG. 2a show a typical statistical distribution of a complex-valued signal distribution, to to FIG. 2c be encoded, of a hologram in the complex plane (FIG. 2a), as well as its real part (FIG. 2b) and its imaginary part (FIG. 2c)
Figure 2B:
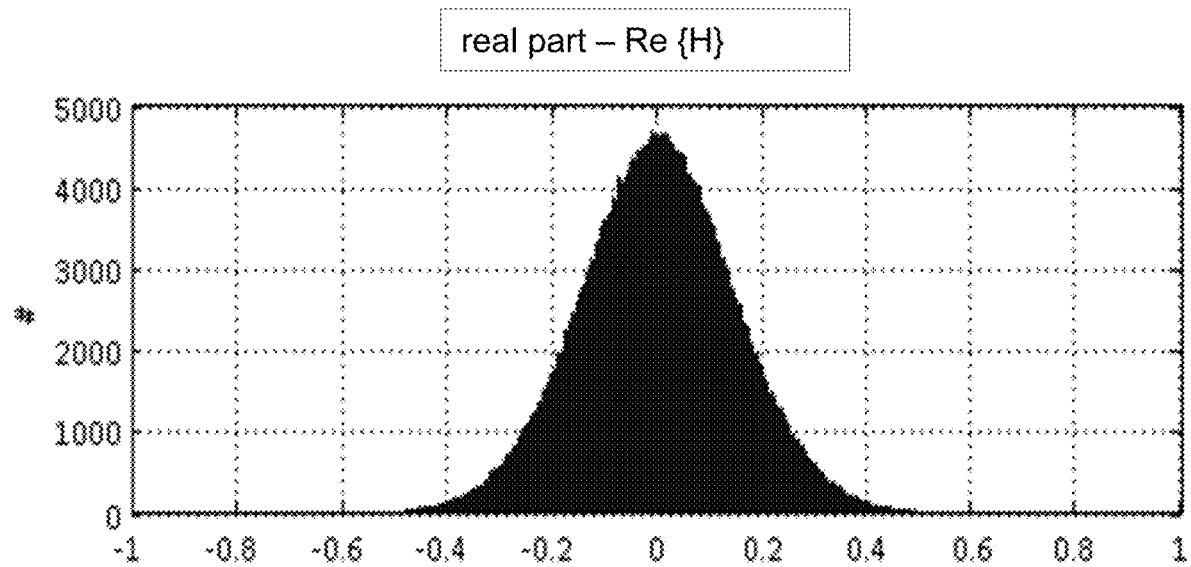
Figure 2C:
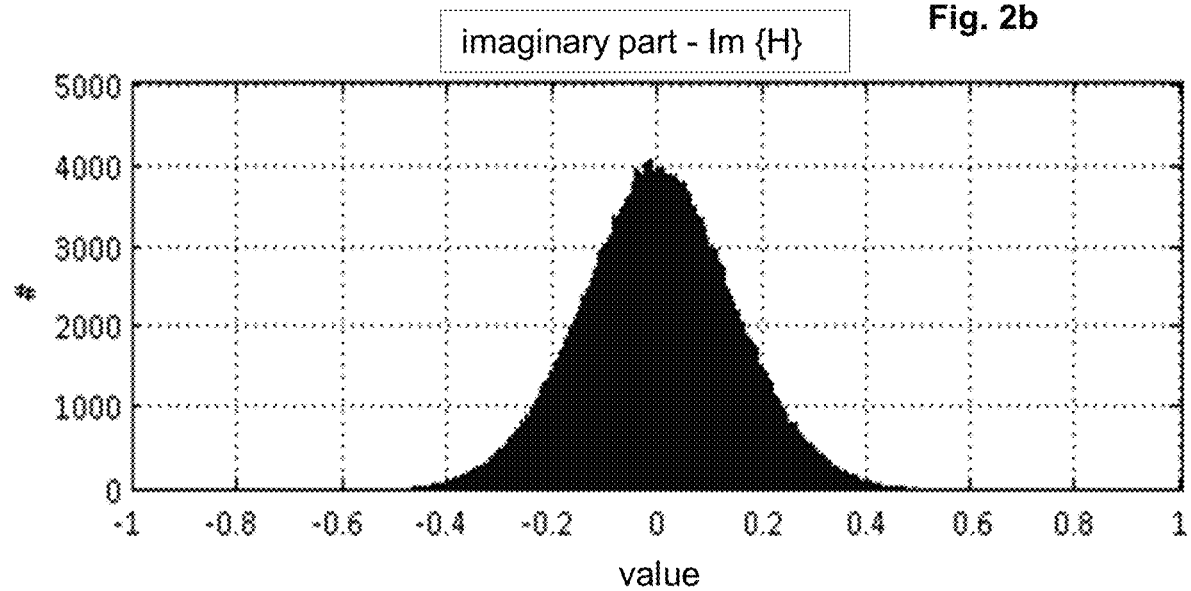
Figure 3A:
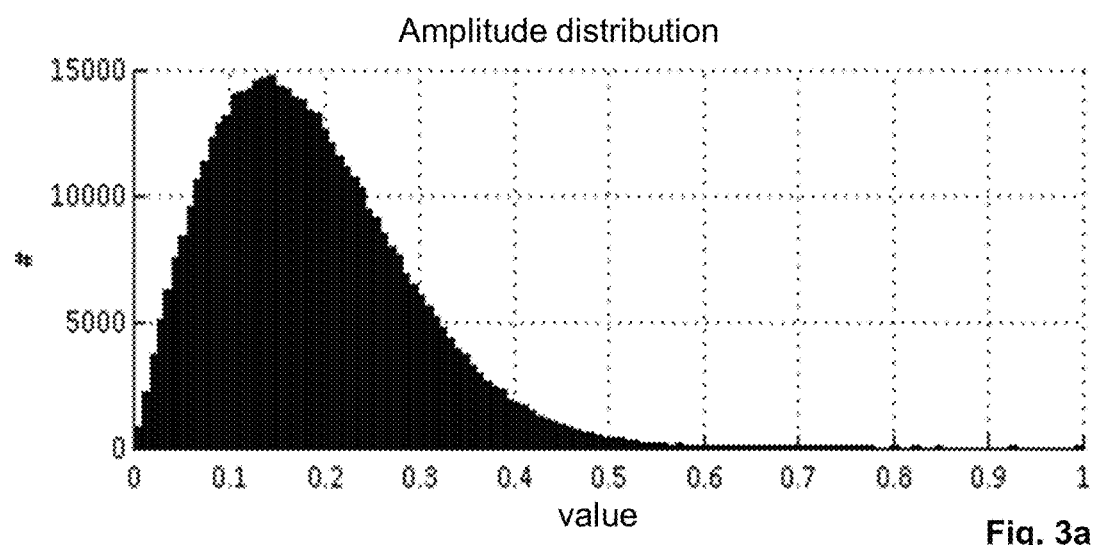
FIG. 3a show a typical statistical distribution of a complex-valued signal distribution, to to FIG. 3c be encoded, of a hologram, represented as a frequency distribution of its amplitude values (FIG. 3a) and its phase values (FIG. 3b), as well as a probability density function approximated to the amplitude distribution, i.e. fitted (FIG. 3c)
Figure 3B:
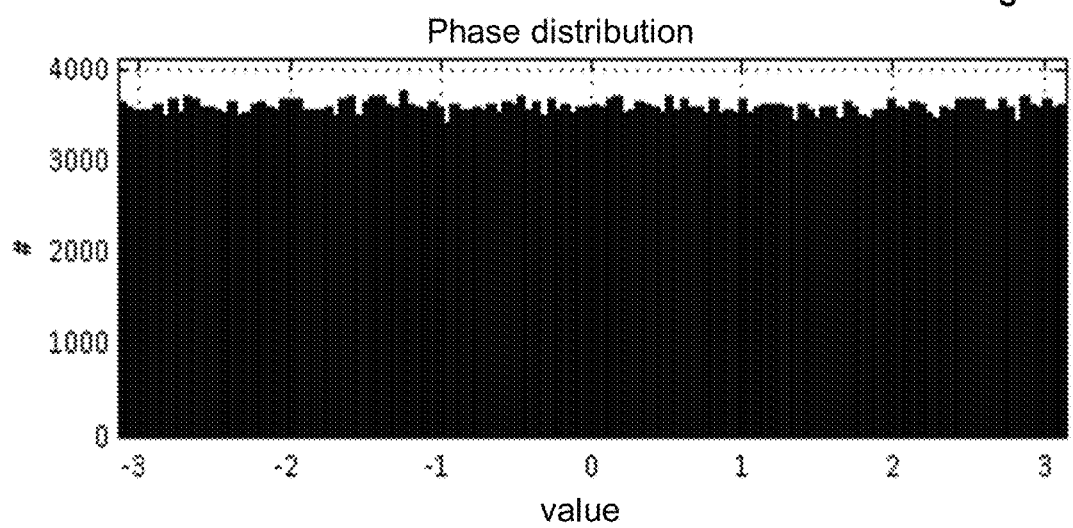
Figure 3C:
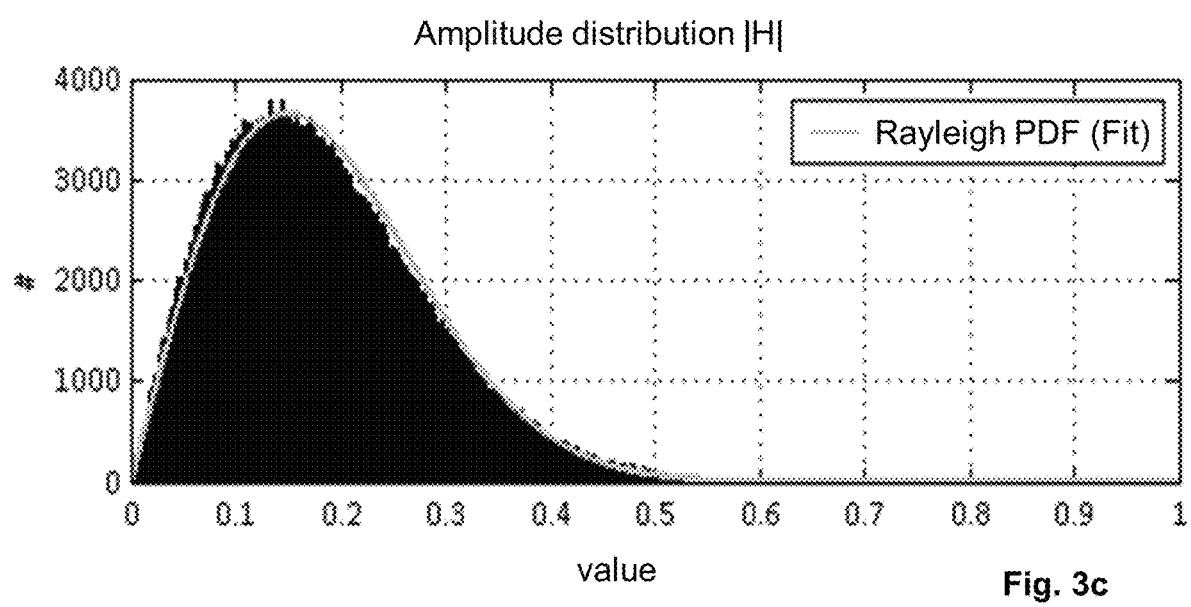

FIG. 2a to FIG. 2c represent a typical statistical distribution of a complex-valued signal distribution, to be encoded, of a hologram in the complex plane (FIG. 2a), as well as its real part (FIG. 2b) an imaginary part (FIG. 2c). FIG. 3a to FIG. 3c then show a typical statistical distribution of a complex-valued signal distribution, to be encoded, of a hologram as a frequency distribution of its amplitude values (FIG. 3a) and its phase values (FIG. 3b), as well as a probability density function approximated to the amplitude distribution, i.e. a fitted probability density function (FIG. 3c).

In order to define suitable boundary conditions in the hologram plane 7 during the iteration method in the context of the present invention, the statistical distribution of the complex amplitude, to be encoded, of the hologram function is deliberately used. The hologram statistics of the ideal complex-valued hologram, i.e. the distribution of amplitude values and phase values, or the distribution of the real and imaginary parts, has a typical shape when a plurality of waves are superimposed to form a hologram. This is the case in the method of "viewing-window holography", but also applies for holograms calculated by other methods. It is typical of such holograms that they have an uniformly phase. The amplitude is typically low: Many values lie in the lower value range of less than 0.4, and only very few values are greater than 0.7. The maximum of the probability density function of the amplitude values lies approximately between 0.1 and 0.2.

Very many distributions are known from probability theory. It is characteristic of the holograms, or complex distributions, to be encoded here that they correspond to a circularly symmetrical complex distribution, or are very close thereto. In this case both the real and imaginary parts of the complex distribution are normally distributed about the origin (0,0) (cf. Goodman, N.R. (1963). "Statistical analysis based on a certain multivariate complex Gaussian distribution (an introduction)", The Annals of Mathematical Statistics 34 (1): 152-177.). One property of the circularly symmetrical complex distribution is that its amplitude distribution corresponds to a Rayleigh distribution. The arithmetic mean of all the amplitude values then corresponds to the expectation value of the Rayleigh distribution, which is defined by $$\sigma\left(\frac{\pi}{2}\right)^{\frac{1}{2}}.$$

This mean value is used for definition of the amplitude boundary condition during the iteration, because this leads to accelerated convergence.

The amplitude boundary condition is preferably defined in each iteration step. It may be selected to be constant over all the iteration steps k, or alternatively variable. For an exemplary complex-valued hologram, with the method improved according to the invention, i.e. the use of the amplitude boundary condition A=mean value of all the amplitude values=expectation value of the Rayleigh distribution, a signal-to-noise ratio SNR of 278 was achieved after 50 iteration steps, the efficiency in the signal range being 29.4%. This is shown in FIG. 4b. A signal-to-noise ratio SNR of 100 is already achieved after 18 iteration steps. When the same hologram was calculated with a comparable method according to the prior art, i.e. by using the amplitude boundary condition A=1), a signal-to-noise ratio SNR of only 13.5 was achieved after 50 iterations, the efficiency in the signal range SW being 1.3%, as represented in FIG. 4a.

In general terms, the probability density function of the hologram amplitude values is used in order to determine the expectation value, i.e. the value that the amplitude assumes on average, which is used as an amplitude boundary condition during the iterative optimization. The variance of the amplitude values may be used as a measure of the number of iteration steps required, as it has an effect on the convergence of the optimization.

Figure 5:
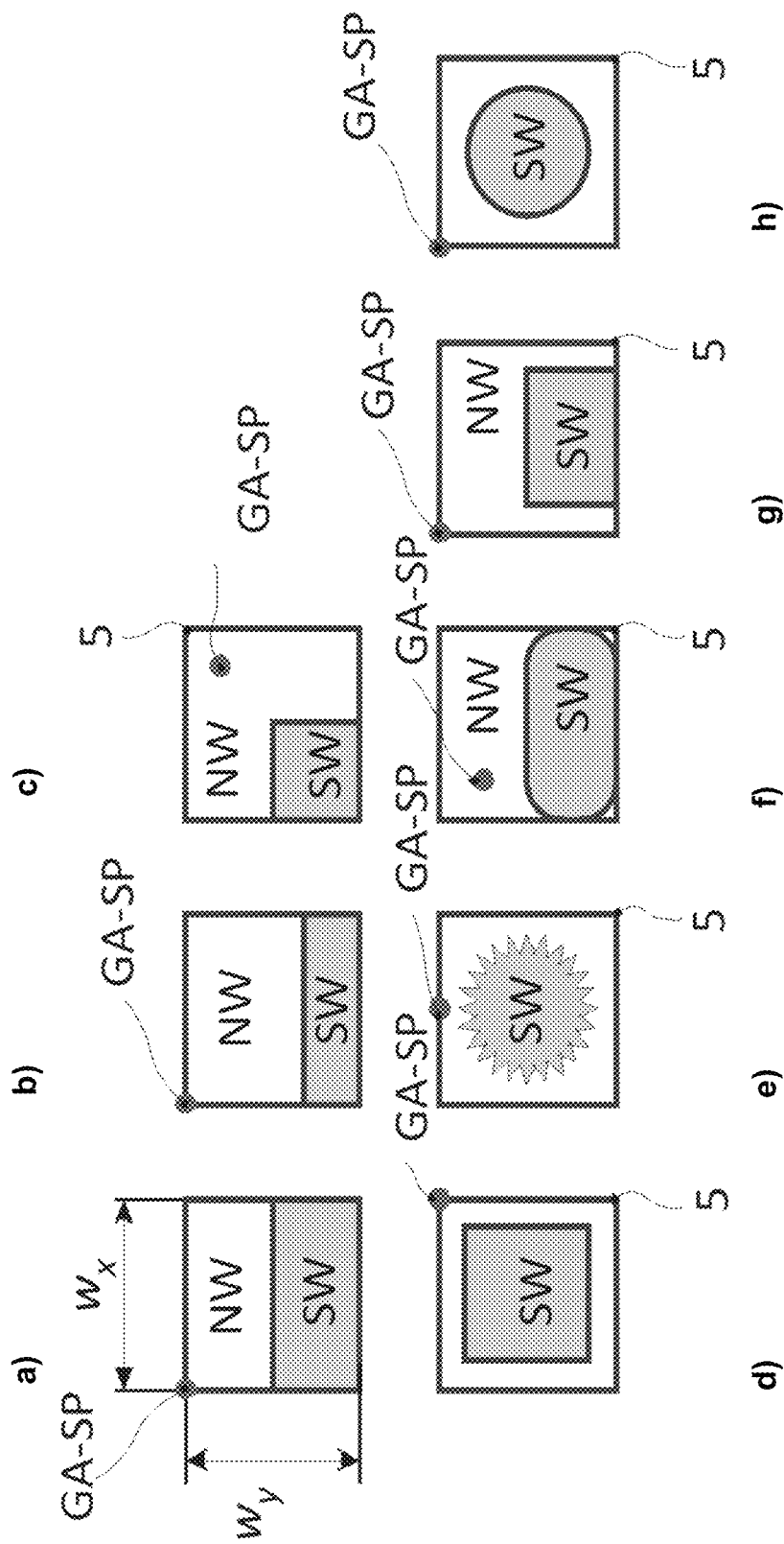
FIG. 5a show various possibilities of the division of a periodicity interval into a signal to FIG. 5h range and a noise range.

The way in which, on the other hand, boundary conditions are adapted suitably in the Fourier plane 6 during the iteration method in the context of the present invention is shown by way of example in FIGS. 5 and 6.

In this case, FIG. 5a to FIG. 5h represent various possibilities of the division of a periodicity interval 5 into a signal range SW and a noise range NW. The size, shape and position of the signal range SW inside the two-dimensional periodicity interval 5 is deliberately selected in such a way that the encoding with the method according to the invention can be optimized. The embedding of the signal range SW in the periodicity interval 5, U(u,v), which has the extent $w_x \times w_y$, is initially carried out once in the initialization phase for definition of the starting values, and then again in each iteration step.

In principle, a better convergence is achieved when the noise range NW is selected to be larger. One approach known in the prior art is therefore, for example, to select only one quarter of the two-dimensional periodicity interval 5 as the signal range SW, and to reserve the remaining three-quarter part of the two-dimensional periodicity interval 5 for a noise signal, i.e. to use it as the noise range NW. This is done in direct reference to the conditions of the hologram plane 7, in particular the pixel number or sub-pixel number of a spatial light modulator 3.

The approach according to the invention, on the other hand, is to not define the area proportions between the signal range SW and the noise range NW by means of the number of sub-pixels which are combined to form a macro-pixel. Instead, the two-dimensional periodicity interval 5 U(u,v) is divided into two arbitrarily shaped ranges, specifically a signal range SW and a noise range NW. Corresponding examples are represented in the various FIGS. 5a to 5h for square pixels, or hologram cells, of a phase-modulating optical element 3. The signal range SW contains the complex-valued signal, which is required for sufficiently good reconstruction of the hologram, while the noise range NW is left variable in terms of its content during the iterative optimization. According to the present invention, the signal range SW is adapted in terms of its shape, size and position inside the two-dimensional periodicity interval 5 optimally to the reconstruction geometry and the far-field diffraction pattern of the computer-generated hologram. Furthermore, it is advantageous to shift the zero order spot GA-SP into a range outside the signal range SW, which may be done by adding a suitable phase wedge onto the phase hologram.

A linear phase wedge, which is added to the phase hologram, has an effect similar to that of an optical prism. By this phase wedge, the position of the signal range SW is displaced. The position of the zero order spot GA-SP generated by unmodulated light, however, is not influenced by a linear phase wedge. By the phase wedge, the position of the zero order spot GA-SP relative to the signal range SW is thus displaced. The relative displacement is preferably carried out in such a way that the zero order spot GA-SP lies outside the signal range SW.

By observer tracking, which takes into account the effect of the phase wedge on the position of the signal range SW, it is possible to achieve the effect that the signal range SW is shifted to the desired position, for instance the detected eye position.

Figure 6A:
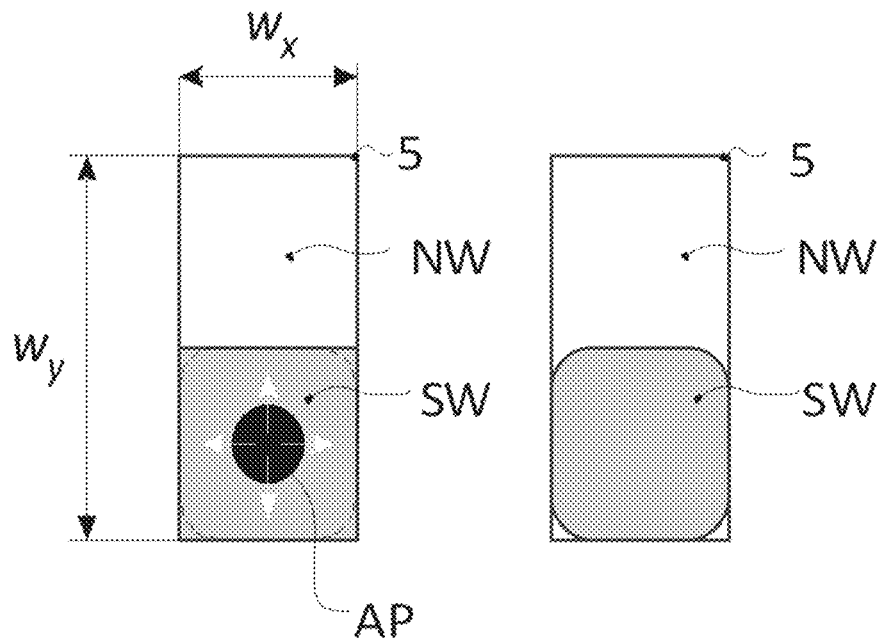
FIG. 6a show variants of signal ranges, which are adapted in terms of their shape, size and FIG. 6b and position to the reconstruction geometry.
Figure 6B:
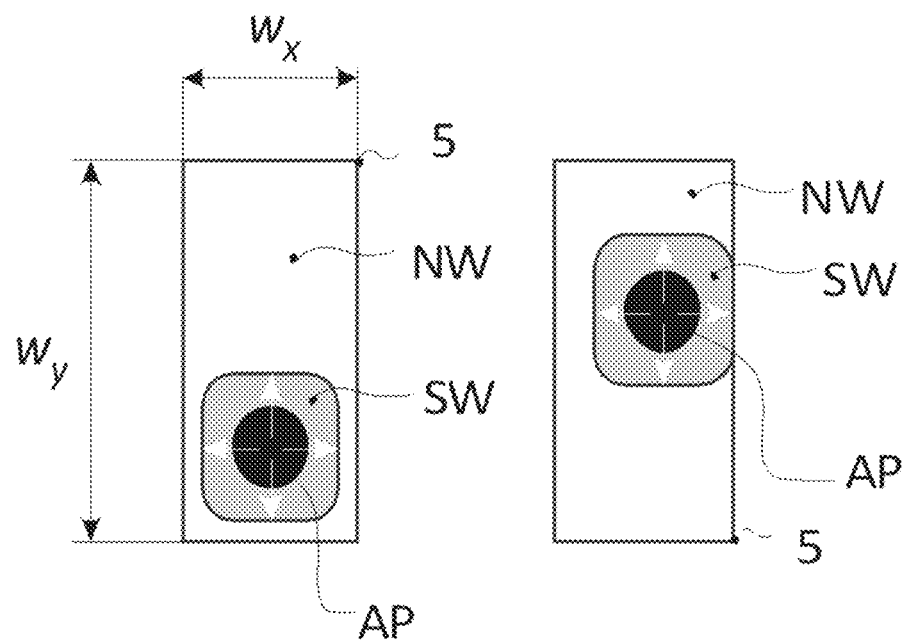

FIG. 6a and FIG. 6b in turn show variants of signal ranges SW, which are adapted in terms of their size, shape and position to the reconstruction geometry. In a computer-generated hologram or a spatial light modulator 3 having rectangular pixels, which are thus arranged in a regular rectangular grid, a rectangular shape of the two-dimensional periodicity interval 5 in the Fourier plane 6 is obtained.

During visual observation of a hologram, the observer's round eye pupil naturally acts as a spatial filter in the Fourier plane 6. The observer's pupil AP can move inside the signal range SW without noise or higher orders of the reconstruction being perceived. However, the pupil AP must lie fully inside the signal range SW, and this may move only to the extent that the edge of the pupil AP reaches the edge of the signal range SW, as represented in FIG. 6a. The union set of all possible pupil areas which lie fully inside a signal range SW selected to be rectangular is therefore smaller than a signal range SW selected to be rectangular. The union set of all possible pupil areas may be mathematically described by a superellipse. In the case represented, the superellipse which results from the union of all possible pupil areas corresponds to a rectangle having corner roundings that correspond to the pupil radius. The corner regions of a signal range SW initially selected to be rectangular are not usable for visual observation, and are therefore used in the context of the invention as an additional area for increasing the noise range NW.

A further possibility in the context of the invention is to select the area of the signal range SW to be significantly less than half the area of the two-dimensional periodicity interval 5, and to position the signal range SW inside the periodicity interval 5 in such a way that the observer's pupil AP is ideally centered with respect to the signal range SW, see FIG. 6b. The information about the pupil position is in this case obtained from a tracking system, which determines the pupil positions of one or more observers in real-time. The advantage of pupil tracking inside the periodicity interval 5 is that the signal range SW can be selected to be significantly smaller than the noise range NW. In this way, the encoding in the context of the present invention is significantly accelerated. It should be noted that the complex-valued hologram signal function $H_f(x,y)$ is calculated with the same number of discrete support points as the phase hologram has discrete resolution cells, i.e. for example pixels or other, optionally variably definable, hologram cells. The complex-valued signal in the Fourier plane 6 is thus provided over the entire periodicity interval 5, but embedded only in the predetermined signal range SW. This ensures that the correct parallax of a reconstructed object 4 is present over the entire periodicity interval 5, even when the observer's eye moves inside the periodicity interval 5.

Figure 7A:
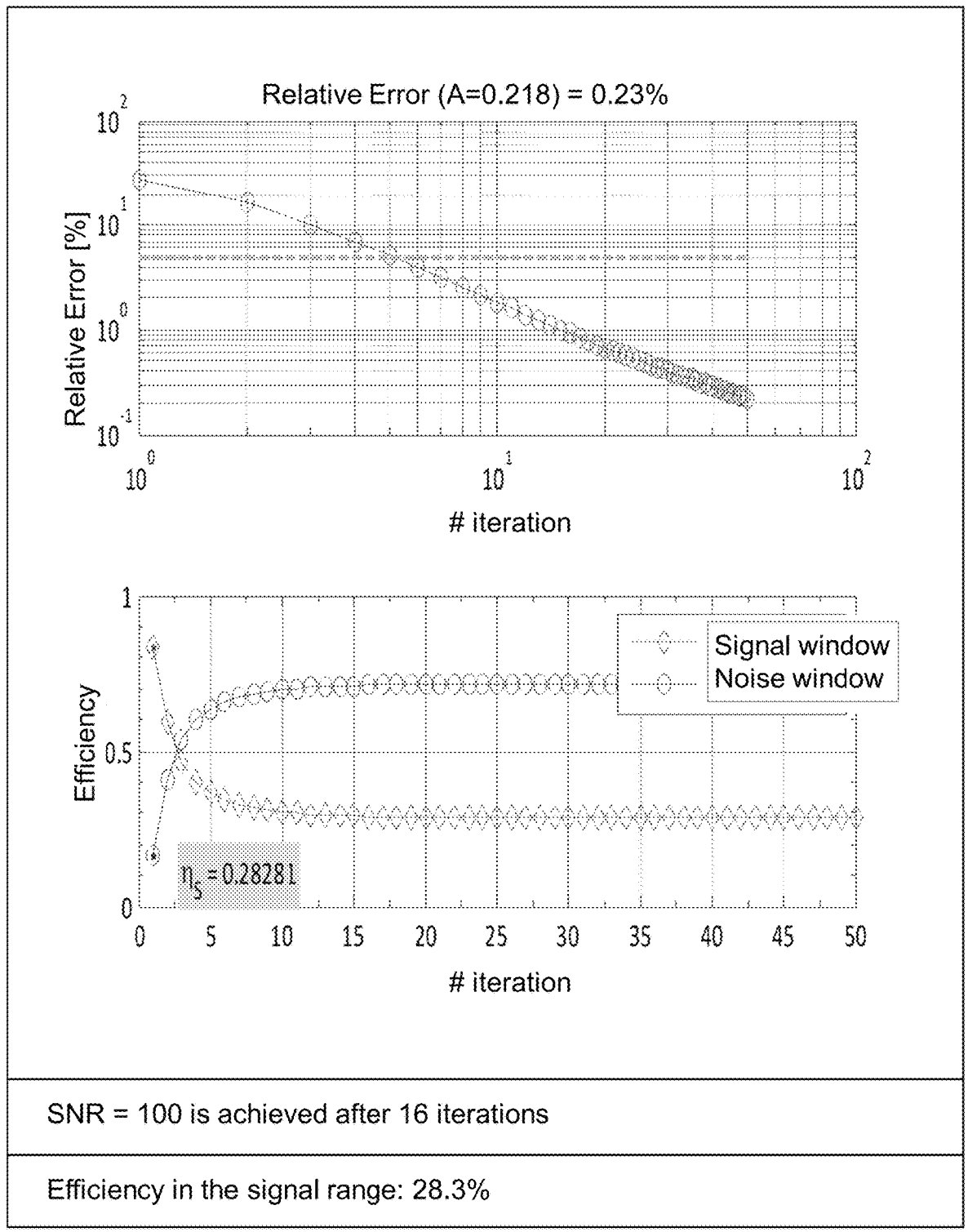
FIG. 7 shows a comparison of the simulation result of the method according to the invention in the case of a significant reduction in size of the signal range (FIG. 7b, 7b') with only slight adaptation of the signal range (FIG. 7a, 7a) in the Fourier plane.
Figure 7B:
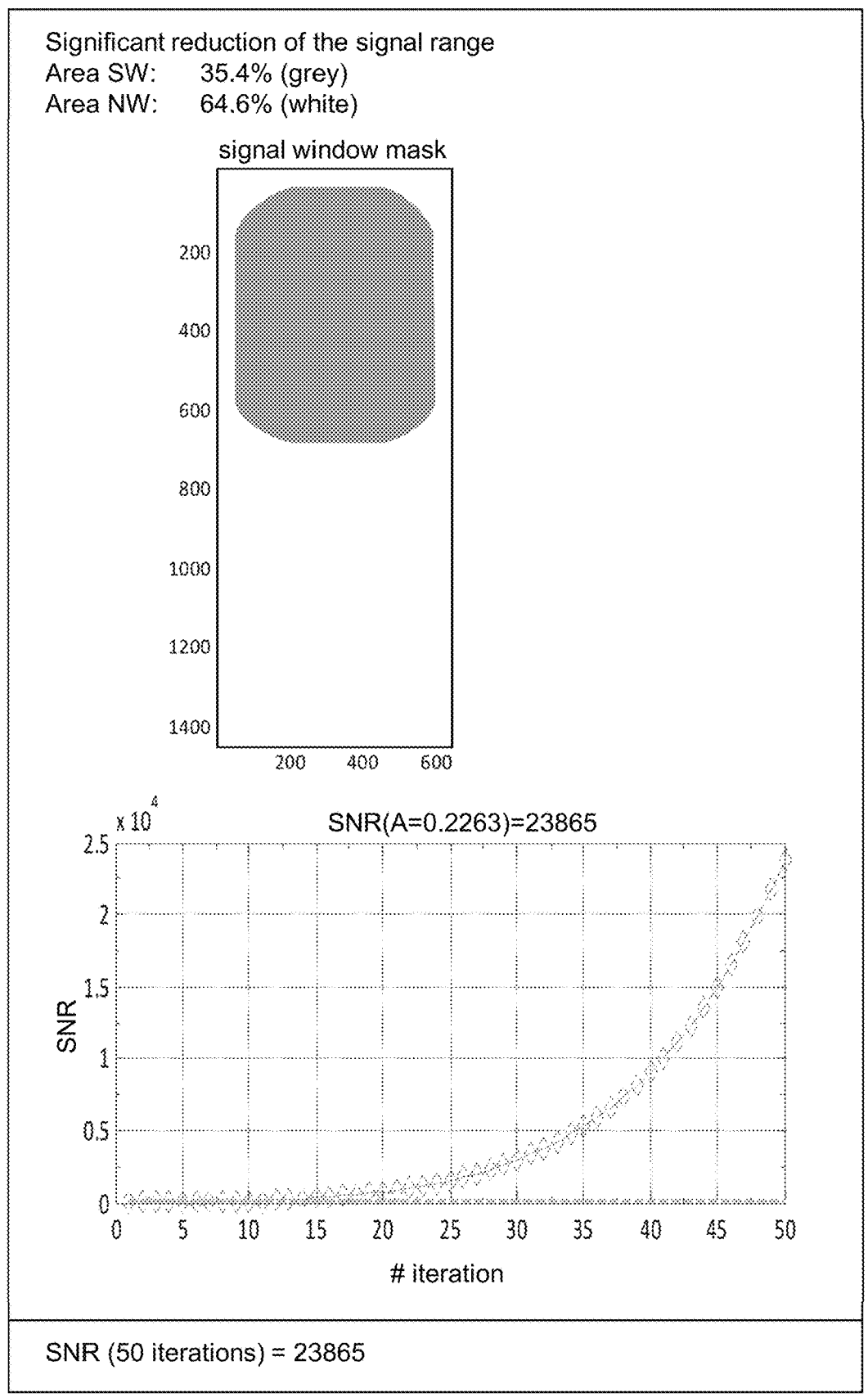
Figure 7B:
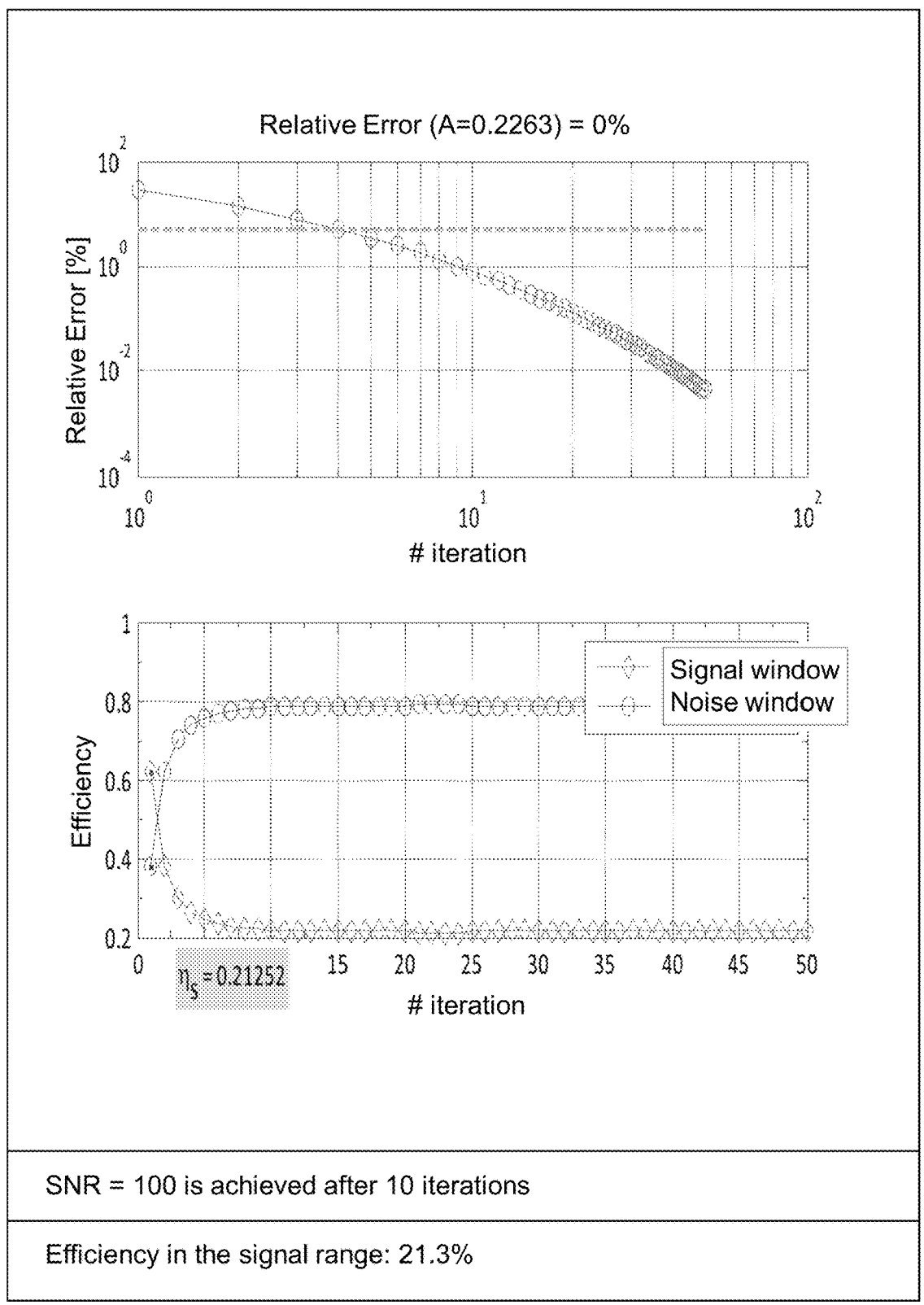

FIGS. 7a, 7a' and 7b, 7b' then show, for an example of a complex-valued hologram, for which with the method according to the invention after 50 iteration steps a signal-to-noise ratio SNR of 449 was achieved with a 48% area proportion of the signal range SW in FIGS. 7a, 7a', and up to 23865 with a 35.4% area proportion of the signal range SW in FIGS. 7b, 7b', where the efficiency in the signal range SW being 28.3% for the conditions of FIGS. 7a, 7a' and 21.3% for the conditions of FIGS. 7b, 7b'. A signal-to-noise ratio SNR of 100 is already achieved after 10 to 16 iteration steps, depending on said area proportion of the signal range SW.

All the variants mentioned here assume that the signal range SW is a continuous area, which is separated by binary masking from the noise range NW, or is embedded into the periodicity interval 5 by means of a binary weighting filter. Other embodiments are, however, also possible in the context of the invention. For example, the signal range SW may additionally be weighted in such a way that the complex signal is optimally present in its middle and decreases in its quality toward its edge. The quality assessment of the signal reconstructed in the iteration steps may, for example, be carried out by weighting with two-dimensional apodization functions, for example a Gaussian, cosine, Hamming or Tukey function, or their central ranges.

As an alternative, a quality decrease toward the edge of the signal range may also be achieved by increasingly inserting individual noise pixels into the actual signal range SW toward the edge, i.e. a gradual transition into the noise range NW is produced. Such a procedure is possible since the reconstruction imaged onto a detector, or the retina of an eye, or a camera, is produced from the wave field which is transmitted by the spatial filter, i.e. the pupil AP of the eye or of an optical system, and minor perturbations may be tolerable.

Alternative encoding methods to the encoding method according to FIGS. 1 to 7b, 7b' will be described below.

As already mentioned, but expressed in other words, a hologram consists of complex values, i.e. of amplitude and phase. By means of a phase-modulating spatial light modulator, however, only phases can be represented. Yet since both items of information, i.e. amplitude and phase, are required for correct representation of the hologram, more than one pixel of the spatial light modulator is usually needed in order to represent the entire information in at least two phase values. This redistribution of the information is also referred to as encoding. Because the entire information is then no longer physically present at one position, errors occur in the reconstructed object. Such errors may be avoided or minimized by suitable encoding according to the invention.

In the case of direct phase encoding, each complex number $z=ae^{i\psi}$ with the phase $\psi$ and the amplitude a between 0 and 1 can be written uniquely as the sum of two complex numbers with the absolute value 1 and the phase values $\psi \pm \arccos a$:

$$Z=ae^{i\psi}=\tfrac{1}{2}(e^{i\varphi_1}+e^{i\varphi_2}) \text{ with } \varphi_1=\psi+\arccos a,$$
$$\varphi_2=\psi-\arccos a.$$

The hologram is in this case normalized to 1, and each complex value is represented as indicated by the formula specified above by two phases. Since the two sub-pixels of the spatial light modulator, into which the phase values are written, have a spatial distance from one another, in the case of oblique light incidence onto the spatial light modulator besides the desired path difference, which is set by the difference of the two phase values, an undesired path difference occurs because of the different path lengths of the light to the pixels. During superposition of the light of the two pixels, this undesired path difference leads to a complex value other than that desired, or required. In order to take into account these errors in the encoding, an algorithm is provided which modifies the phase values by means of various iteration stages, in such a way that their transform in the signal range, which corresponds to the observer window, does not differ, or differs only slightly, from the setpoint values. Such an algorithm for quality improvement of the encoded hologram will be described below. As already described elsewhere in this application, for example, the size, shape and position of the signal range may in this case be selected suitably.

To this end, the algorithm contains the following steps:
(i) determination of the complex-valued hologram from object datasets of the three-dimensional object.
(ii) selection of the parameters (shape, size, position) of the signal range and determination of the setpoint values in the signal range
(iii) encoding of the hologram in the form of a phase hologram (starting values for the iteration)
(iv) transformation of the phase hologram into the signal range SW and the noise range NW
   calculation of an absolute value D of the weighted difference of the setpoint values B and the actual values A (transform of the phase hologram) in the signal range SW while considering the weighting factor g.

$$D_{i,j} = \left| B_{i,j} - \frac{1}{g} A_{i,j} \right| \text{ with } g = \sqrt{\frac{\sum_{k,j} |A_{ij}|^2}{\sum_{k,j} |B_{ij}|^2}}$$

calculation of the mean deviation $\alpha_\varphi$, $$a_\phi = 100 \sqrt{\frac{\sum_{k,j} |D_{ij}|^2}{\sum_{k,j} |B_{ij}|^2}}$$

replacement of the actual values A in the signal range SW with the setpoint values B multiplied by the weighting factor g
(v) back transformation of the replaced signal range SW and of the noise range NW from the observer plane into the hologram plane
(vi) application of the amplitude boundary condition in the hologram plane:
   replacement of the amplitude values with predetermined values, for example the constant amplitude value 1.

Steps (iii) to (vi) are in this case repeated until the average deviation $\alpha_\varphi$ is as small as required, for example lies below 5%.

A further alternative encoding method is based on decomposition of the encoded hologram into clusters.

Typically, for a holographic display with an observer window, a complex-valued hologram is calculated from a three-dimensional (3D) scene by decomposing this scene into individual object points (i.e. object datasets) and calculating a sub-hologram for each object point. The sub-holograms are then added to form the sum hologram. The lateral position of the individual sub-holograms in the sum hologram depends on the lateral position of the object point, the size of the sub-hologram depending on the depth position of the object point. Even if the calculation of a hologram for the holographic display is carried out in another way, for example by means of a Fourier transform, sub-holograms are likewise obtained.

A typical size of a sub-hologram may for example be 50×50 pixels, while the entire hologram may for example contain 2000×1000 pixels or more. Each sub-hologram thus typically occupies only a very small section of the sum hologram.

In this case, only a particular section of the sum hologram with the size of the respective sub-hologram respectively contributes locally to the reconstruction of a particular scene point, or a particular object point of a scene.

The approach described below is therefore based on the idea that a phase hologram may also be optimized locally by iterative calculation. To this end, a section, which will also be referred to below as a cluster, of the sum hologram is selected. For this section, an iterative Fourier calculation is then carried out separately.

The aim in this case is to locally improve the reconstruction of the three-dimensional scene, primarily for those object points whose sub-holograms are present in the hologram section (cluster) being used.

In order to optimize the entire hologram, it may be decomposed into smaller parts, so called clusters. These are then optimized individually with an iterative algorithm—optionally as described in relation to the previous encoding method with the steps (i) to (vi), or else as disclosed in WO 2007/082707 A1.

Advantageously, use is in this case made of the fact that a larger number of Fourier transforms of a small array of numerical values require fewer calculation operations than a small number of Fourier transforms of a large array.

For a fast Fourier transform (FFT) of a vector of N numerical values, it is known for example that they have a running time T of the order O as follows: $T(N)=O(N \log(N))$. If this vector of N values were, for example, to be decomposed into M smaller vectors each with N/M numerical values and all M vectors were to be transformed, then the calculation time would then be $M \times T(N/M) = M \times O(N/M \log (N/M)) = O(N \log (N/M))$. The calculation time would therefore be reduced, since the logarithm gives a smaller value.

Since the iterative algorithm is in essential parts based on a Fourier transform, a reduction of the calculation time is also achieved overall by the division into individual clusters.

Since the hologram generally consists of very many mutually overlapping sub-holograms, it is scarcely possible to carry out division of the hologram into clusters without cutting through at least some sub-holograms at the cluster boundaries. In general, there are object points of the three-dimensional scene for which one part of the sub-hologram lies in one cluster and another part in another cluster.

In the case of separate optimization of the individual clusters, it may therefore occur that an only insufficient quality of the reconstruction of the three-dimensional scene is achieved in the transition region between the individual clusters—above all for object points whose sub-holograms are cut by the cluster boundary into two parts, which are optimized iteratively in different clusters. The transition region between the individual clusters could therefore, for example, be undesirably visible as a small perturbation in the reconstructed three-dimensional scene.

For this reason, in one embodiment of the invention, the iterative calculation in clusters is only intended to be used for pre-optimization. Then, after the iterative calculation, the clusters are reassembled to form a large phase hologram. This is subsequently followed by a further few iteration steps with the Fourier transform of the entire hologram. In relation to the computational effort, however, this method nevertheless still leads to a calculation saving relative to many iteration steps with the large phase hologram.

In general, interleaving may also be envisioned in this approach. To this end, individual clusters could be decomposed into even smaller sub-clusters, and the larger clusters could be pre-optimized with these.

In one preferred embodiment, the size of the selected clusters is oriented toward the sub-hologram sizes occurring. For example, an individual sub-hologram may be distributed at most over two clusters. The maximum size of a sub-hologram is dictated by the depth range of a three-dimensional scene. This maximum sub-hologram size occurs either for object points which lie as far as possible in front of the display to the observer, or for object points which lie as far as possible behind the display.

If the holographic display is configured for a particular depth range of the three-dimensional scene, for a typical observer distance and for a typical observer window size, or signal range size, then typical sub-hologram sizes may be determined from these parameters. From these, a suitable or defined cluster size may then also be determined or selected. One example of a cluster size might be 128×128 pixels.

Preferably, division of the complex-valued sum hologram into clusters is carried out. For each individual cluster, its own setpoint values in the signal range in the observer plane are then determined.

The iterative calculation is then carried out for each individual cluster in a similar way as if the cluster were the entire sum hologram. Different possible variants, as for example described above in the application, may be used for such iterative calculation.

After the optimization of the individual clusters, the thus determined phase holograms of the respective clusters are combined to form a larger phase hologram.

If this iterative calculation in clusters is only used as pre-optimization, and if further optimization of the entire phase hologram is then intended to be carried out in additional iteration steps, then for this the setpoint values in the observer plane are advantageously determined from the entire complex-valued sum hologram.

The combined phase hologram from the optimization of the individual clusters then, as it were, forms the starting values for the further calculation.

Figure 8:
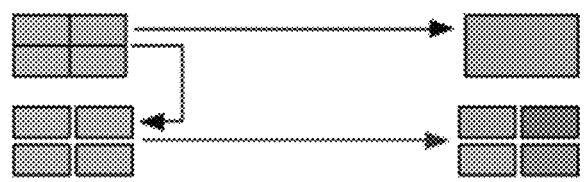
FIG. 8 shows a schematic representation of an alternative encoding method.

FIG. 8 schematically shows the calculation of the setpoint values for the entire sum hologram in the signal range (above) and the calculation of the setpoint values for the individual clusters in the signal range (below).

In general, setpoint values in the signal range in the observer plane could also be calculated only from the entire sum hologram, and these setpoint values could be used for the iterative calculation of the individual clusters.

Figure 9:
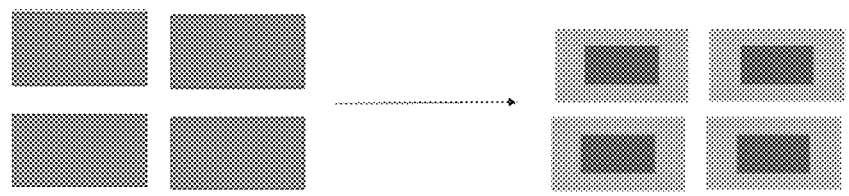
FIG. 9 shows a schematic representation for the configuration of the signal range.

Preferably, according to FIG. 9, for the iterative calculation for the individual clusters, the signal range and the noise range are respectively selected in the same size and shape. The signal range is in this case, for example, represented as a rectangle in dark gray, the noise range likewise being configured in the shape of a rectangle, but light gray. As can be seen in FIG. 9, the signal range is configured to be smaller in its size than the noise range.

Figure 10:
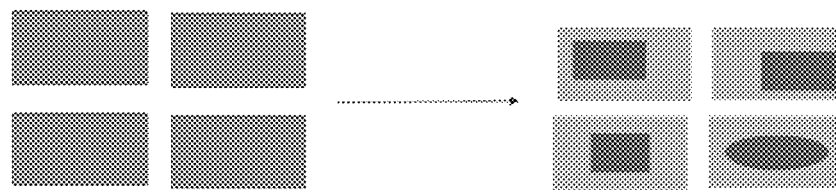
FIG. 10 shows an alternative configuration of the signal ranges for the individual clusters.
Figure 11:
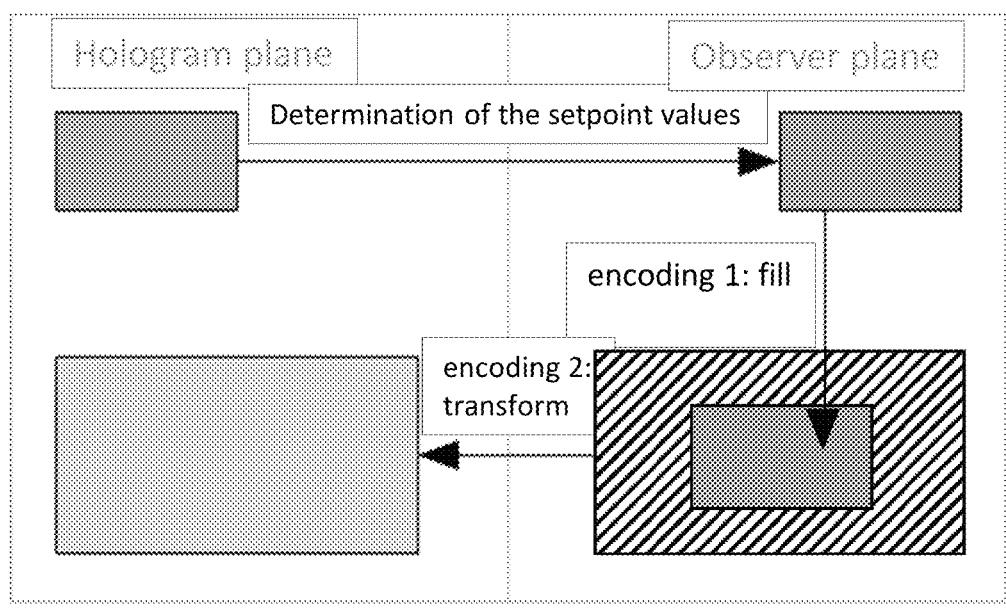
FIG. 11 shows a schematic representation of an indirect encoding method.
Figure 12A:
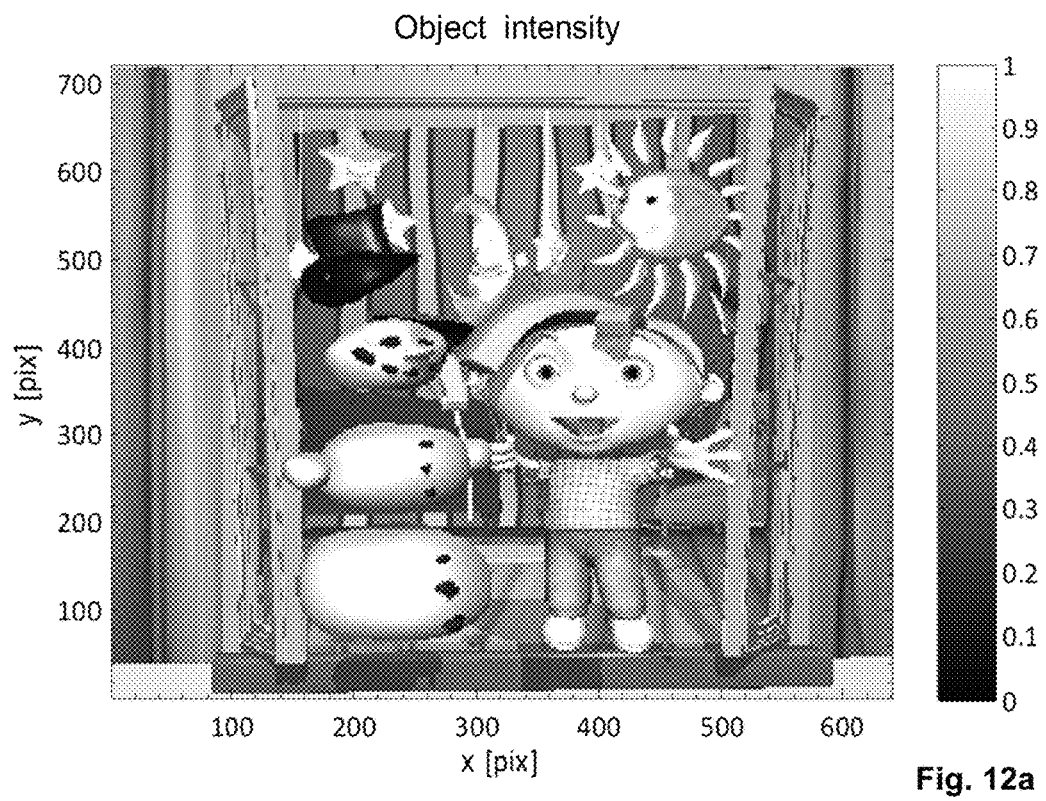
FIG. 12a show an example of a three-dimensional object which is used for to 12e simulations of the method according to the invention.
Figure 12B:
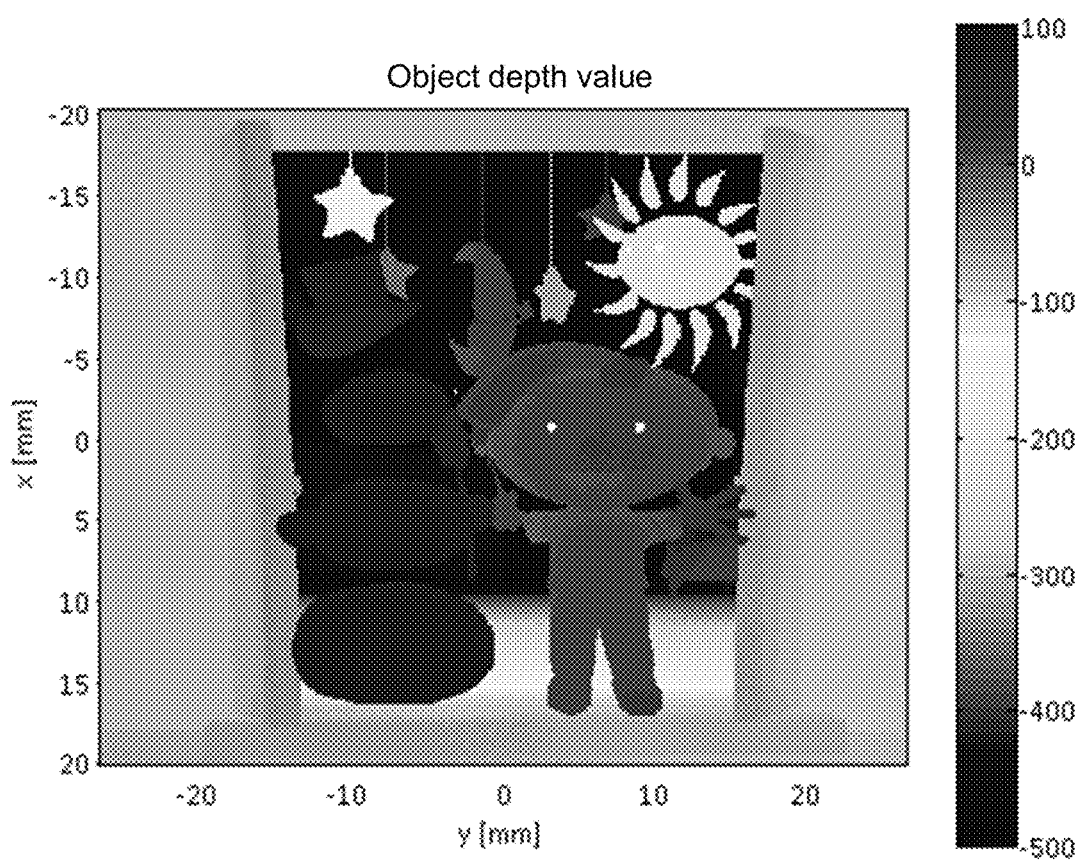
Figure 12C:
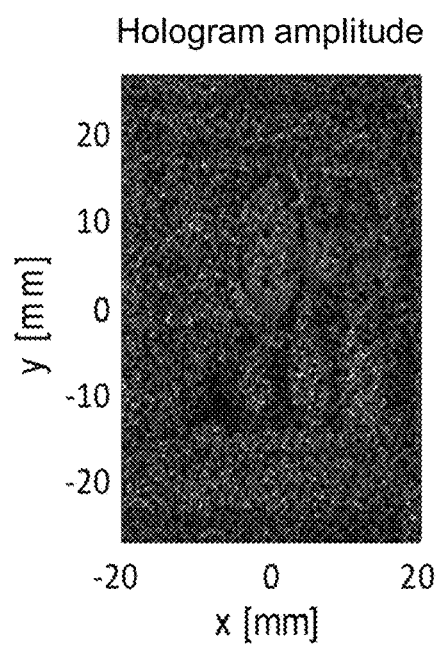
Figure 12D:
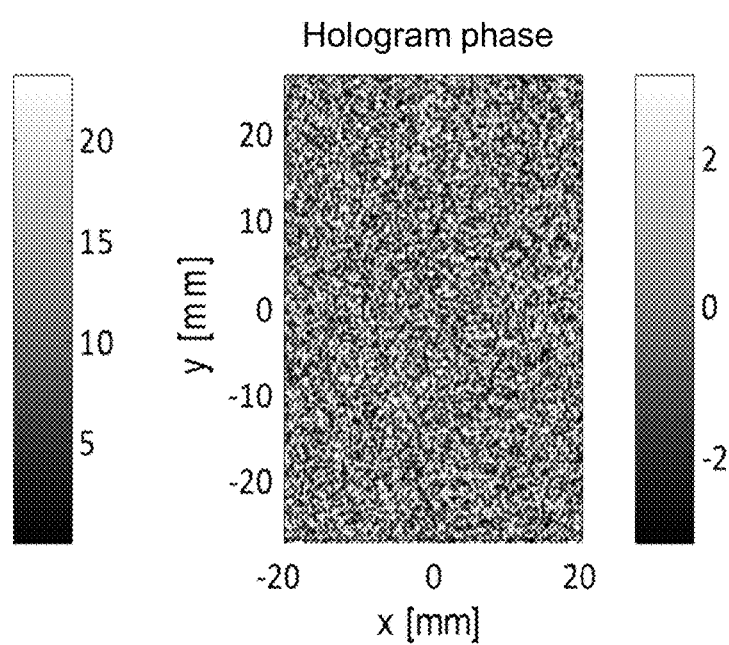
Figure 12E:
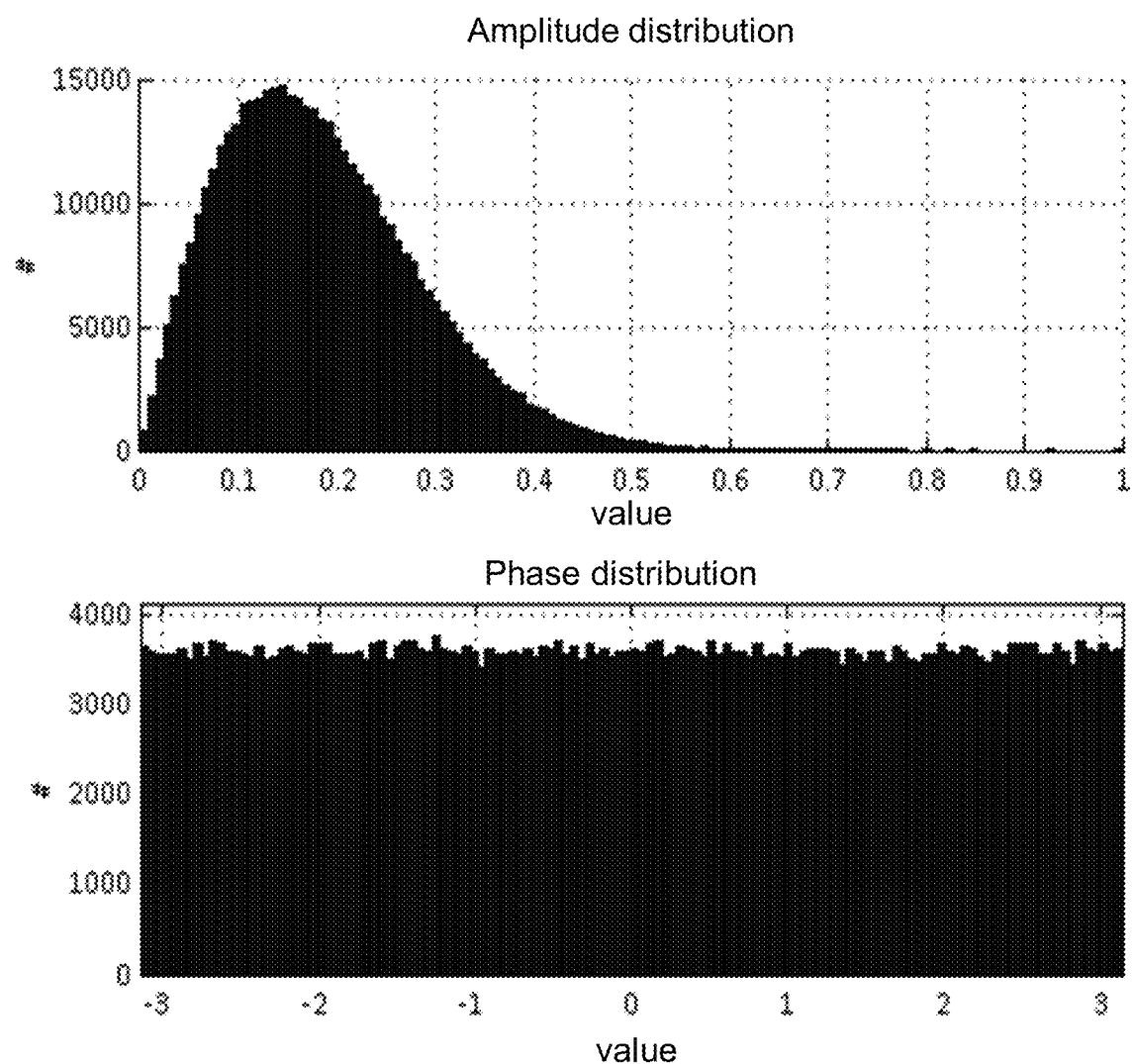

In general, however, the position, the size and the shape of the signal ranges for the individual clusters may also differ, as represented in FIG. 10. For example, the signal range of one cluster could be less than or greater than the signal range for another cluster. Also, the signal range could for example have a rectangular, square, round or even elliptical shape, in which case the signal ranges of a plurality of clusters may then have different shapes. With respect to the position of a signal range, it is for example possible for it to be arranged centrally in the noise range, or alternatively laterally shifted relative thereto, as represented in FIG. 10. Of course, other sizes, shapes and positions of the signal ranges in the noise range, or in the observer plane, are also possible.

A different shape or size of the signal range is, for example, expedient when it is to be assumed that, for an equal size of the clusters, after a fixed number of iteration steps a greater residual error would be obtained for some clusters than for others. For these clusters, a signal range which is smaller in size is preferably selected, in order to reduce the residual error.

Furthermore, the signal range could also be adapted dynamically during the iterative calculation.

On the one hand, a signal range that is as large as possible is desirable. On the other hand, it is also particularly important to have a small residual error of the iterative calculation in the signal range, so that a good reconstruction quality of the three-dimensional scene can be achieved. Optionally, therefore, a signal range which is smaller in its size with a good reconstruction quality of the three-dimensional scene is to be preferred over a signal range which is larger in its size with only a moderate reconstruction quality of the three-dimensional scene.

In this embodiment with dynamic adaptation of the signal range, therefore, setpoint values are initially determined for a signal range which is large in size, and the iterative calculation is started with this signal range. After a predetermined number of iteration steps, a residual error is determined. The further calculation is carried out depending on whether this residual error lies below or above a predetermined threshold. If the residual error lies above the threshold, the signal range is made smaller, while if it lies below the threshold the signal range is kept. This may optionally also be carried out in a plurality of stages. For example, after 5 iteration steps a decision could be made as to whether the signal range is reduced by 10% in its size, and after 10 iteration steps whether the signal range is optionally reduced further in its size by a further 10%.

Such a procedure may optionally be carried out for the entire hologram. As an alternative, it may also be combined with the calculation by means of clusters. For example, the signal range may also be individually adapted dynamically for individual clusters.

For reducing the number of iteration steps required, suitable selection of the starting values for the iteration is also important.

A direct encoding method in this case refers to a method (as also described above) in which a complex-valued hologram is initially calculated, and a phase hologram having starting values for the iteration is then determined from the complex-valued hologram. This may, for example, be done with the aid of two-phase encoding. Each complex hologram value is then assigned a pair of two phase values, according to the formula given above.

In this case, the starting values are initially specified independently of the signal range SW and the noise range NW, and their incorporation is carried out in the first iteration step.

In an alternative indirect encoding method, the determination of starting values for the iteration is carried out not in the hologram but in the two-dimensional periodicity interval in the observer plane. Besides the setpoint values in the signal range SW, starting values in the noise range NW are specified there.

The encoding of a phase hologram is thus carried out in analogy with the last two steps of the description above
(v) back transformation of the signal range SW with setpoint values and of the noise range NW with starting values from the observer plane into the hologram plane
(vi) application of the amplitude boundary condition in the hologram plane: replacement of the amplitude values with predetermined values, for example the constant amplitude value 1.

One embodiment of selection of the starting values in the noise range NW consists, for example, in filling it with zeros.

In another embodiment, the starting values in the noise range are determined as constant amplitudes and randomly distributed phase values.

In another embodiment, amplitudes and phases are distributed randomly.

According to Parseval's theorem, the sum of the intensities of a value distribution is equal to the sum of the intensities of its Fourier transform. If there is a phase hologram with N×M phase values of amplitude 1 in the hologram plane, then the sum of the intensities of all the pixels $I_{phaseholo}$=N×M×1. Consequently, in the observer plane, in the signal range and noise range together, there must in total likewise be the intensity N×M×1. With the predetermined setpoint values in the signal range, the intensity $I_{SW}$ in the signal range can be calculated. In one preferred embodiment, the amplitude of the starting values in the noise range is selected in such a way that $I_{NW}=I_{phaseholo}-I_{SW}$.

For randomly distributed amplitudes, for example, the interval in which the random values are determined may be selected suitably in such a way that it essentially gives the desired overall intensity.

The amplitude of a phase hologram is generally constant for all pixels, but need not necessarily be set to 1, but may also receive a constant value $a_{const}$<1. In this case, the sum of the intensities would be $I_{phaseholo}$=N×M×$a^2$.

In order to obtain the same intensity in the signal range, the intensity in the noise range would then be less. Conversely, it is also possible to multiply the setpoint values in the signal range by a factor >1, in order to modify the ratio of the intensity in the signal range relative to the intensity in the noise range, i.e. the ratio $I_{SW}/I_{NW}$.

An increase in $I_{SW}/I_{NW}$ generally entails a brighter reconstruction of the three-dimensional (3D) scene for the same illumination of the spatial light modulator, and is therefore preferred. In general, however, a somewhat smaller ratio $I_{SW}/I_{NW}$ leads to a lower number of iteration steps until a predetermined residual error is reached. In general, a medium value of $I_{SW}/I_{NW}$ is therefore sought as a compromise.

In another embodiment of the selection of starting values, which is suitable in particular for a series of holograms with similar three-dimensional objects, for example a video sequence, consists in using the result of the noise range NW after a series of iteration steps from the preceding iteration for individual image number n−1 as starting values for the noise range for the iteration of individual image number n.

This embodiment is also suitable in particular for combination with the division of the hologram into clusters.

Since, in a video sequence, parts of a three-dimensional object often remain unchanged in successive individual images, and the sub-holograms of these three-dimensional objects then have a fixed position and limited spatial extent in the hologram, it is to be expected that, also for some of the clusters of a hologram, the result of the iteration of the preceding individual image represents a good starting value for a new iteration of the next individual image. Optionally, with the aid of a comparison of the individual images n and n−1, it is also possible to determine in which clusters a large proportion of the object points match, and to determine the starting values with the aid of the preceding image only for those clusters, but to use other starting values for other clusters.

As an alternative to using the values in the noise range from the preceding individual image for the indirect encoding, for a video sequence in direct encoding it is also possible to use the phase hologram from the preceding individual image as starting values in the hologram plane.

One method, which is known from greyscale dithering and has also already been used in the compensation of quantization errors in binary holograms, is the error diffusion method.

In the error diffusion method, an error of an individual pixel is distributed with weighting onto the neighboring pixels. If, for example, in phase encoding, a complex value $Z_{i,j} = a_{i,j} e^{i \psi_{i,j}}$ with amplitude $a_{i,j} \leq 1$ and phase $\psi_{i,j}$ is replaced with a value with amplitude 1 and the same phase $Z_{i,j}' = 1 e^{i \psi_{i,j}}$, then an error $\Delta_{i,j} = Z_{i,j}' - Z_{i,j} = (1-a_{i,j})e^{i \psi_{i,j}}$ results in this case.

In the error diffusion method, this error of a pixel is distributed on to its neighboring pixels. For example, one quarter of the error is in each case added to the left, right, lower and upper neighboring pixels. Then, for example, for the neighbors, i+1,j $Z_{i+1,j}^{new} = Z_{i+1,j} + 0.25 \Delta_{i,j}$.

Distribution onto four neighbors with the factor 0.25 only serves as an example in this case.

Various weightings are possible, in which for example a part of the error may also be distributed on to the respective next-but-one pixels or pixels further away. If the amplitudes of the other pixels are subsequently set to 1, then their error is also redistributed over their respective neighbors.

According to the invention, it is proposed here, in one embodiment, to combine the error diffusion method with an iterative calculation. This may optionally be done either once at the start of the iteration or in each iteration step. In this case, after the back transformation of the signal range SW and the noise range NW from the observer plane into the hologram plane, and before application of the amplitude boundary condition in the hologram plane, an intermediate step is carried out in which errors of the amplitude values are distributed onto the neighboring pixels by means of the error diffusion method.

For example, setpoint values in the signal range are determined and zeros are used as starting values in the noise range. A back transformation of the signal range and noise range into the hologram plane is then carried out. As a result of the back transformation, a complex-valued hologram is initially obtained in the hologram plane. The error diffusion method is applied to these complex values. Subsequently, all the amplitudes are set to a constant value 1. This may also be combined with other embodiments, for example an iterative calculation in clusters, by applying the error diffusion method separately for each cluster.

Another possibility is also, after having carried out iteration of the individual clusters and combination of the clusters to form a larger hologram, to carry out the error diffusion method only locally at the boundaries between two clusters.

FIGS. 12a to 12e shows the example of a three-dimensional object 4, which is used for simulations of the method according to the invention, as are represented in FIGS. 4a and 4b for adaptation of the amplitude value in the hologram plane, and FIGS. 7a, 7a' and 7b, 7b' for adaptations of the signal range.

FIG. 13 in turn represents in a sectional view an example of a holographic display 10 according to the invention for the reconstruction of a three-dimensional object 4, 4-1, 4-2.

The holographic display 10 comprises an optical system, which has a light source 1 for providing coherent light, a transformation lens 2 as transformation optics, and a phase-modulating spatial light modulator 3 as a phase-modulating optical element, which comprises a hologram plane 7.

The holographic display 10 furthermore comprises a control unit 8. The latter has a range of control functions, and is configured to calculate the encoding of a computer-generated hologram of a three-dimensional object 4, 4-1, 4-2 and to provide the corresponding control signals for the optical system, i.e. for the light source 1, the phase-modulating spatial light modulator 3 and, in a variant in which it is controllable, the transformation optics 2. To this end, the control unit 8 is connected to these components by means of communication paths 9, 9-1.

The holographic display 10 furthermore comprises a reconstruction plane 6, also referred to as observer plane. This plane is not a physically existing fixed plane: It is virtual and its distance from the phase-modulating spatial light modulator 3, or the hologram plane 7, varies with the separation which an observer's eye pupil AP has from the hologram plane 7. In this plane, a two-dimensional periodicity interval 5 is defined, which contains a signal range SW and noise range NW.

The reconstruction of the three-dimensional object 4, 4-1, 4-2 can be seen in a signal range SW of the two-dimensional periodicity interval 5 of the observer plane 6. In this case, the three-dimensional object 4, 4-1 may lie between the observer plane 6 and the hologram plane 7. The three-dimensional object 4, 4-2 may, however, also be visible behind the hologram plane, as seen from the observer plane 6. It is also possible for the three-dimensional object to extend over the entire range, i.e. between the observer plane 6 and the hologram plane 7 as well as behind the hologram plane 7.

The control unit 8 is then configured to carry out a method according to the invention as described above, with which the encoding of the phase-modulating spatial light modulator 3 with the computer-generated hologram is carried out by iterative calculation with rapid convergence, i.e. a small number of required iteration steps, and with maximal diffraction efficiency. The method which is carried out by the control unit 8 in this case transforms spatial distributions which represent the three-dimensional object 4, 4-1, 4-2, during the iteration steps forward and back between the observer plane 6 and the hologram plane 7, which is denoted by a corresponding virtual communication path 9, 9-2 that is not a real connection but an imaginary connection and is intended to represent that the control unit provides values for the encoding of the phase-modulating spatial light modulator 3 in the hologram plane 7 for a view of the signal range SW of a periodicity interval 5, respectively in a defined observer plane 6.

Finally, it should be pointed out that the exemplary embodiments explained above merely serve for description of the claimed teaching, but do not restrict the latter to the exemplary embodiments. In particular, the exemplary embodiments described above could—insofar as is possible—be combined with one another.

The invention claimed is:

1. A method for encoding complex-value signals of a computer-generated hologram into a phase-modulating optical element for the reconstruction of a three-dimensional object, in which a transformation algorithm for iterative calculation of the computer-generated hologram is used, wherein by transformation of object data sets of the three-dimensional object into a signal range of a two-dimensional periodicity interval in an observer plane, a two-dimensional distribution of complex values of a wave field is calculated, which forms a complex-valued setpoint value distribution and being used as a comparison basis for the iterative calculation of the control values of the encoding, the two-dimensional periodicity interval comprising the signal range and a noise range, where in a numerical iteration in repeating iteration steps by inverse transformation of the complex-valued setpoint value distribution of the signal range and of a complex-valued actual value distribution of the noise range of the two-dimensional periodicity interval of the observer plane into a hologram plane of the phase-modulating optical element, a transformed complex valued distribution consisting of amplitude values and phase values is determined, and from this a distribution of phase values as control values of the encoding of the phase-modulating optical element is determined, and by transformation of this distribution of phase values into the two-dimensional periodicity interval of the observer plane, a complex-valued actual value distribution is determined, until a termination criterion is fulfilled, in order finally to encode the phase-modulating optical element with the last determined distribution of phase values as control values, where at least one of the parameters: shape and weighting filter of the signal range of the periodicity interval is adapted in such a way that the noise range is enlarged in comparison with the signal range, where the at least one of the parameters shape and weighting filter is adaptable in combination with the adaptation of at least one of size and position parameters of the signal range.

2. The method as claimed in claim 1, wherein a complex-valued starting distribution in the noise range is selected in a first iteration step.

3. The method as claimed in claim 2, wherein for a sequence of computer-generated holograms (CGH), the actual values from the last iteration step in the preceding computer-generated hologram from the sequence are used as a complex-valued starting distribution in the noise range or as a starting distribution of phase values of the phase-modulating optical element for a computer-generated hologram from the sequence.

4. The method as claimed in claim 1, wherein a starting distribution of phase values of the phase-modulating optical element is selected, and a complex-value actual value distribution is determined in a first iteration step by transformation of this distribution of phase values into the two-dimensional periodicity interval of the observer plane.

5. The method as claimed in claim 1, wherein, in at least one iteration step, the determination of a distribution of phase values as control values of the encoding of the phase-modulating optical element from the transformed complex-valued distribution of amplitude values and phase values is carried out as follows:

(1) determination of an error for each value of the complex-valued distribution of amplitude values and phase values (2) addition of this error by an error diffusion method, weighted to the neighboring complex values, so that a modified complex-valued distribution results (3) setting of the amplitudes of the complex-valued distribution modified in this way to a constant value.

6. The method as claimed in claim 1, wherein the zero order spot in the two-dimensional periodicity interval is arranged outside the signal range.

7. The method as claimed in claim 1, wherein the computer-generated hologram comprises a single-parallax hologram or a full-parallax hologram.

8. The method as claimed in claim 1, wherein the signal range is additionally weighted in such a way that the complex-valued signal is optimally present in its middle and decreases in its quality toward its edge.

9. The method as claimed in claim 1, in which a colored computer-generated hologram is encoded into a phase-modulating optical element for the reconstruction of a three-dimensional object, wherein the calculation of the phase values by means of numerical iteration for the encoding for each primary color is carried out separately in sub-holograms, which are combined to form the colored computer-generated hologram.

10. The method as claimed in claim 1, wherein a two-dimensional distribution of complex values of a wave field is calculated by transformation of object data sets of the three-dimensional object into a first signal range of a first two-dimensional periodicity interval and into a second signal range of a second two-dimensional periodicity interval in an observer plane, and the iterative calculation of the control values of the encoding of the phase-modulating optical element is carried out for both two-dimensional periodicity intervals.

11. The method as claimed in claim 1, wherein at least one of the parameters: size, shape, position and weighting filter of the signal range of the periodicity interval is modified in the course of the repeating iteration steps.

12. The method as claimed in claim 1, wherein, for the encoding of complex-valued signals of a computer-generated hologram in a phase-modulating optical element, the computer-generated hologram is divided into clusters, and the determination of a distribution of phase values as control values of the encoding of the phase-modulating optical element is carried out individually for each cluster.

13. The method as claimed in claim 12, wherein the size of the clusters is determined in such a way that it essentially corresponds to the typical size or maximum size of a sub-hologram in the computer-generated hologram.

14. The method as claimed in claim 12, wherein at least one of the parameters: size, shape, position and weighting filter of the signal range of the periodicity interval is selected differently for the individual clusters.

15. A non-transitory computer program product which is configured to carry out a method as claimed in claim 1.

16. A holographic display for the reconstruction of a three-dimensional object, comprising:

an optical system, which comprises a light source for providing coherent light, a transformation optics and a phase-modulating optical element having a hologram plane, a control unit configured for calculating the encoding of a computer-generated hologram of the three-dimensional object and for providing the corresponding control signals for the optical system, wherein the reconstruction of the three-dimensional object can be seen in a signal range of a two-dimensional periodicity interval of an observer plane, characterized in that the control unit is configured for carrying out a method as claimed in claim 1.

17. The holographic display as claimed in claim 16, wherein the phase-modulating optical element is a spatial light modulator, in particular a phase-modulating spatial light modulator.

18. The holographic display as claimed in claim 16, which further comprising a filter for carrying out filtering between the signal range and the noise range.

19. The holographic display as claimed in claim 16, which, for the encoding of complex-valued signals of a colored computer-generated hologram comprises in the phase-modulating optical element sub-pixels for encoding sub-holograms for each primary color, or which is configured for displaying sub-holograms of each primary color in chronological succession.

20. The method as claimed in claim 1, wherein from the statistical distribution of amplitude values of the computer-generated hologram to be encoded, a suitable amplitude value is determined which specifies the amplitude boundary condition during the numerical iteration.

21. The method as claimed in claim 20, wherein an expectation value for use as an amplitude boundary condition during the numerical iteration is determined from the probability density function of the amplitude values of the computer-generated hologram to be encoded.

22. The method as claimed in claim 20, wherein a Fourier transform is used as the transformation algorithm, and the numerical iteration carries out k iteration steps as follows:

(1) application of the inverse Fourier transform to a matrix U(u,v,k) for calculation of the complex amplitude in the hologram plane, i.e.

$$IFT\{U(u,v,k)\}=H(x,y,k)=A(x,y,k)\exp[i\phi(x,y,k)],$$

(2) definition of the amplitude boundary condition in the hologram plane $A_c*x,y,k)\leq 1$, (3) application of the Fourier transform to the corrected hologram function $FT\{A_c(x,y,k)\exp[i\phi(x,y,k)]\}=U(u,v,k)$ for calculation of an actual value distribution in the observer plane and assessment of the signal quality by means of a quality criterion, for example the signal-to-noise ratio, between the actual value distribution and the setpoint value distribution in the signal range for comparison with the termination criterion, (4) establishment of input boundary conditions in the observer plane by rewriting the complex-valued setpoint value distribution into the signal range of the periodicity interval, in particular of the matrix: U:

$$S(u,v) \rightarrow U(u,v,k),$$

so long as the termination criterion is not satisfied.

23. The method as claimed in claim 22, wherein the following definition of the signal-to-noise ratio is used as a quality criterion for the complex-valued distributions:

$$SNR = \frac{\iint_D |S_n(u,v)|^2 dudv}{\iint_D |S_n(u,v) - \beta S_r(u,v)|^2 dudv}$$

with $$\beta = \frac{\iint_D \text{Re}\{S_n(u,v) \cdot S_r(u,v)\} dudv}{\iint_D |S_r(u,v)|^2 dudv}$$

where $S_n$ is the setpoint value distribution in the signal range and $S_r$ is the actual value distribution in the signal range, and the integration is carried out over the area D of the signal range.

24. The method as claimed in claim 20, wherein the amplitude boundary condition is A=mean value of the amplitude distribution.

25. The method as claimed in claim 20, wherein the amplitude boundary condition is A=mean value of the amplitude distribution.

26. A method for encoding complex-valued signals of a computer-generated hologram into a phase-modulating optical element for the reconstruction of a three-dimensional object, in which a transformation algorithm for iterative calculation of the computer-generated hologram is used, where by transformation of object data sets of the three-dimensional object into a signal range of a two-dimensional periodicity interval in an observer plane, a two-dimensional distribution of complex values of a wave field is calculated, which forms a complex-valued setpoint value distribution and being used as a comparison basis for the iterative calculation of the control values of the encoding, the two-dimensional periodicity interval comprising the signal range and a noise range, where in a numerical iteration in repeating iteration steps by inverse transformation of the complex-valued setpoint value distribution of the signal range and of a complex-valued actual value distribution of the noise range of the two-dimensional periodicity interval of the observer plane into a hologram plane of the phase-modulating optical element, a transformed complex valued distribution consisting of amplitude values and phase values is determined, and from this a distribution of phase values as control values of the encoding of the phase-modulating optical element is determined, and by transformation of this distribution of phase values into the two-dimensional periodicity interval of the observer plane, a complex-valued actual value distribution is determined, until a termination criterion is fulfilled, in order finally to encode the phase-modulating optical element with the last determined distribution of phase values as control values, where from the statistical distribution of amplitude values of the computer-generated hologram to be encoded, a suitable amplitude value is determined which specifies the amplitude boundary condition during the numerical iteration, where the amplitude boundary condition is A≠1.

27. The method as claimed in claim 26, wherein at least one of the parameters: size, shape, position and weighting filter of the signal range (SW) of the periodicity interval (5) is adapted in such a way that the noise range (NW) is enlarged in comparison with the signal range (SW).

28. The method as claimed in claim 26, wherein a complex-valued starting distribution in the noise range is selected in a first iteration step.

29. The method as claimed in claim 26, wherein a starting distribution of phase values of the phase-modulating optical element is selected, and a complex-value actual value distribution is determined in a first iteration step by transformation of this distribution of phase values into the two-dimensional periodicity interval of the observer plane.

30. The method as claimed in claim 28, wherein for a sequence of computer-generated holograms, the actual values from the last iteration step in the preceding computer-generated hologram from the sequence are used as a complex-valued starting distribution in the noise range or as a starting distribution of phase values of the phase-modulating optical element for a computer-generated hologram from the sequence.

31. The method as claimed in claim 26, wherein an expectation value for use as an amplitude boundary condition during the numerical iteration is determined from the probability density function of the amplitude values of the computer-generated hologram to be encoded.

32. The method as claimed in claim 26, wherein a Fourier transform is used as the transformation algorithm, and the numerical iteration carries out k iteration steps as follows:
  (5) application of the inverse Fourier transform to a matrix U(u,v,k) for calculation of the complex amplitude in the hologram plane, i.e.

$$IFT\{U(u,v,k)\}=H(x,y,k)=A(x,y,k)\exp[i\phi(x,y,k)],$$

(6) definition of the amplitude boundary condition in the hologram plane $A_c(x,y,k) \leq 1$,
  (7) application of the Fourier transform to the corrected hologram function $FT\{A_c(x,y,k)\exp[i\phi(x,y,k)]\}=U(u,v,k)$
    for calculation of an actual value distribution in the observer plane and assessment of the signal quality by means of a quality criterion, for example the signal-to-noise ratio, between the actual value distribution and the setpoint value distribution in the signal range for comparison with the termination criterion,
  (8) establishment of input boundary conditions in the observer plane by rewriting the complex-valued setpoint value distribution into the signal range of the periodicity interval, in particular of the matrix: U:

$$S(u,v) \to U(u,v,k),$$

so long as the termination criterion is not satisfied.

33. The method as claimed in claim 32, wherein the following definition of the signal-to-noise ratio is used as a quality criterion for the complex-valued distributions:

$$SNR = \frac{\iint_D |S_n(u,v)|^2 dudv}{\iint_D |S_n(u,v) - \beta S_r(u,v)|^2 dudv}$$

with $$\beta = \frac{\iint_D \text{Re}\{S_n(u,v) \cdot S_r(u,v)\} dudv}{\iint_D |S_r(u,v)|^2 dudv}$$

where $S_n$ is the setpoint value distribution in the signal range and $S_r$ is the actual value distribution in the signal range, and the integration is carried out over the area D of the signal range.

34. The method as claimed in claim 26, wherein, in at least one iteration step, the determination of a distribution of phase values as control values of the encoding of the phase-modulating optical element from the transformed complex-valued distribution of amplitude values and phase values is carried out as follows:
  (1) determination of an error for each value of the complex-valued distribution of amplitude values and phase values
  (2) addition of this error by an error diffusion method, weighted to the neighboring complex values, so that a modified complex-valued distribution results
  (3) setting of the amplitudes of the complex-valued distribution modified in this way to a constant value.

35. The method as claimed in claim 26, wherein the zero order spot in the two-dimensional periodicity interval is arranged outside the signal range.

36. The method as claimed in claim 26, wherein the computer-generated hologram comprises a single-parallax hologram or a full-parallax hologram.

37. The method as claimed in claim 26, wherein the signal range is additionally weighted in such a way that the complex-valued signal is optimally present in its middle and decreases in its quality toward its edge.

38. The method as claimed in claim 26, in which a colored computer-generated hologram is encoded into a phase-modulating optical element for the reconstruction of a three-dimensional object, wherein the calculation of the phase values by means of numerical iteration for the encoding for each primary color is carried out separately in sub-holograms, which are combined to form the colored computer-generated hologram.

39. The method as claimed in claim 26, wherein a two-dimensional distribution of complex values of a wave field is calculated by transformation of object data sets of the three-dimensional object into a first signal range of a first two-dimensional periodicity interval and into a second signal range of a second two-dimensional periodicity interval in an observer plane, and the iterative calculation of the control values of the encoding of the phase-modulating optical element is carried out for both two-dimensional periodicity intervals.

40. The method as claimed in claim 26, wherein at least one of the parameters: size, shape, position and weighting filter of the signal range of the periodicity interval is modified in the course of the repeating iteration steps.

41. The method as claimed in claim 26, wherein, for the encoding of complex-valued signals of a computer-generated hologram in a phase-modulating optical element, the computer-generated hologram is divided into clusters, and the determination of a distribution of phase values as control values of the encoding of the phase-modulating optical element is carried out individually for each cluster.

42. The method as claimed in claim 41, wherein the size of the clusters is determined in such a way that it essentially corresponds to the typical size or maximum size of a sub-hologram in the computer-generated hologram.

43. The method as claimed in claim 41, wherein at least one of the parameters: size, shape, position and weighting filter of the signal range of the periodicity interval is selected differently for the individual clusters.

44. The method as claimed in claim 20, wherein the amplitude boundary condition is defined in each iteration step, the amplitude boundary condition is selected to be variable over all the iteration steps.

45. The holographic display as claimed in claim 44, wherein the phase-modulating optical element is a spatial light modulator, in particular a phase-modulating spatial light modulator.

46. The holographic display as claimed in claim 44, further comprising a filter for carrying out filtering between the signal range and the noise range.

47. The holographic display as claimed in claim 44, which, for the encoding of complex-valued signals of a colored computer-generated hologram comprises in the phase-modulating optical element sub-pixels for encoding sub-holograms for each primary color, or which is configured for displaying sub-holograms of each primary color in chronological succession.

48. The method as claimed in claim 26, wherein the amplitude boundary condition is defined in each iteration step, the amplitude boundary condition is selected to be variable over all the iteration steps.

49. A non-transitory computer program product which is configured to carry out a method as claimed in claim 26.

50. A holographic display for the reconstruction of a three-dimensional object, comprising:
- an optical system, which comprises a light source for providing coherent light, a transformation optics and a phase-modulating optical element having a hologram plane,
- a control unit configured for calculating the encoding of a computer-generated hologram of the three-dimensional object and for providing the corresponding control signals for the optical system,
- where the reconstruction of the three-dimensional object can be seen in a signal range of a two-dimensional periodicity interval of an observer plane, where the control unit is configured for carrying out a method as claimed in claim 26.

* * * * *